US012324120B2

(12) United States Patent
Harvey et al.

(10) Patent No.: US 12,324,120 B2
(45) Date of Patent: Jun. 3, 2025

(54) CONTROL SYSTEM HAVING AN ADJACENT ELECTRONIC DISPLAY FOR AUTO LABELING AND GUIDED WIRING

(71) Applicant: PassiveLogic, Inc., Salt Lake City, UT (US)

(72) Inventors: Troy Aaron Harvey, Salt Lake City, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 464 days.

(21) Appl. No.: 17/177,061

(22) Filed: Feb. 16, 2021

(65) Prior Publication Data

US 2022/0066432 A1 Mar. 3, 2022

Related U.S. Application Data

(60) Provisional application No. 63/070,460, filed on Aug. 26, 2020.

(51) Int. Cl.
*F24F 11/32* (2018.01)
*F24F 11/49* (2018.01)
(Continued)

(52) U.S. Cl.
CPC ........... *H05K 7/1465* (2013.01); *F24F 11/32* (2018.01); *F24F 11/49* (2018.01); *F24F 11/63* (2018.01);
(Continued)

(58) Field of Classification Search
CPC ..... H02J 2310/12; H02J 3/00; G06F 2113/16; G06F 2115/12; G06F 30/392;
(Continued)

(56) References Cited

U.S. PATENT DOCUMENTS

| 4,353,653 A | 10/1982 | Zimmerman |
| 5,208,765 A | 5/1993 | Turnbull |

(Continued)

FOREIGN PATENT DOCUMENTS

| CN | 103926912 B | 5/2014 |
| CN | 206002869 U | 8/2016 |

(Continued)

OTHER PUBLICATIONS

De Meester et al., SERIF:A Semantic Exercise Interchange FormatConference: Proceedings of the 1st International Workshop on LINKed EDucation, Oct. 2015.
(Continued)

*Primary Examiner* — Anthony R Jimenez

(57) ABSTRACT

A controller is described with an adjacent electronic display which allows users to input building plans, and to design where devices (e.g., equipment and sensors) are to go. The controller has access to databases of the devices including wiring diagrams and protocols, such that the controller can automatically create a wiring diagram that can be used to wire the building and the controller. The adjacent display can be moved to show controller wiring, while the display shows a wiring diagram which describes a diagram of the controller wiring including devices that are connected, and wiring information about the devices.

20 Claims, 14 Drawing Sheets

(51) Int. Cl.

| | | |
|---|---|---|
| *F24F 11/63* | (2018.01) | |
| *F24F 11/88* | (2018.01) | |
| *G01R 31/55* | (2020.01) | |
| *G05B 13/02* | (2006.01) | |
| *G05B 15/02* | (2006.01) | |
| *G05B 19/048* | (2006.01) | |
| *G05B 23/02* | (2006.01) | |
| *G06F 1/3209* | (2019.01) | |
| *G06F 1/3246* | (2019.01) | |
| *G06F 3/041* | (2006.01) | |
| *G06F 3/0482* | (2013.01) | |
| *G06F 3/04847* | (2022.01) | |
| *G06F 3/147* | (2006.01) | |
| *G06F 8/41* | (2018.01) | |
| *G06F 8/51* | (2018.01) | |
| *G06F 8/53* | (2018.01) | |
| *G06F 8/74* | (2018.01) | |
| *G06F 9/4401* | (2018.01) | |
| *G06F 30/12* | (2020.01) | |
| *G06F 30/13* | (2020.01) | |
| *G06F 30/18* | (2020.01) | |
| *G06F 30/392* | (2020.01) | |
| *G06F 111/04* | (2020.01) | |
| *G06F 111/16* | (2020.01) | |
| *G06F 113/04* | (2020.01) | |
| *G06F 113/16* | (2020.01) | |
| *G06F 115/12* | (2020.01) | |
| *G06Q 30/0283* | (2023.01) | |
| *H02J 3/00* | (2006.01) | |
| *H04B 3/46* | (2015.01) | |
| *H04L 43/50* | (2022.01) | |
| *H04L 67/12* | (2022.01) | |
| *H04L 67/125* | (2022.01) | |
| *H04L 67/75* | (2022.01) | |
| *H04M 3/30* | (2006.01) | |
| *H04W 4/80* | (2018.01) | |
| *H04W 84/00* | (2009.01) | |
| *H05K 7/14* | (2006.01) | |

(52) U.S. Cl.
CPC ............ *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/04186* (2019.05); *G06F 3/0482* (2013.01); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(58) Field of Classification Search
CPC .............. G06F 2113/04; G06F 2111/04; G06F 2111/16; G06F 1/3209; G06F 1/3246; G06F 3/0482; G06F 3/04847; G06F 3/147; G06F 8/436; G06F 8/51; G06F 8/53; G06F 8/74; G06F 9/4418; G06F 3/04186; G06F 30/18; G06F 30/13; G06F 30/12; G06F 8/41; G06F 9/4401; H05K 7/1468; H05K 7/1477; H05K 7/1481; H05K 7/1465; H05K 7/14; H04W 84/00; H04W 4/80; H04M 3/305; H04M 3/30; H04L 67/125; H04L 43/50; H04L 67/12; H04L 67/75; H04B 3/46; G06Q 30/0283; G05B 13/0265; G05B 15/02; G05B 19/048; G05B 23/0216; G05B 23/0264; G05B 23/0272; G01R 31/55; F24F 11/32; F24F 11/49; F24F 11/63; F24F 11/88
See application file for complete search history.

(56) References Cited

U.S. PATENT DOCUMENTS

| | | | |
|---|---|---|---|
| 5,530,643 A | 6/1996 | Hodorowski | |
| 6,275,962 B1 | 8/2001 | Fuller et al. | |
| 6,301,341 B1 | 10/2001 | Gizara et al. | |
| 6,362,734 B1 * | 3/2002 | McQuade | ............... B60R 22/48 |
| | | | 340/439 |
| 6,606,731 B1 | 8/2003 | Baum et al. | |
| 6,645,066 B2 | 11/2003 | Gutta et al. | |
| 6,813,777 B1 | 11/2004 | Weinberger et al. | |
| 7,304,855 B1 | 12/2007 | Milligan et al. | |
| 7,578,135 B2 | 8/2009 | Mattheis | |
| 7,587,250 B2 | 9/2009 | Coogan et al. | |
| 7,702,421 B2 | 4/2010 | Sullivan et al. | |
| 7,729,882 B2 | 6/2010 | Seem | |
| 7,734,572 B2 | 6/2010 | Wiemeyer et al. | |
| 7,835,431 B2 | 11/2010 | Belge | |
| 7,917,232 B2 | 3/2011 | McCoy et al. | |
| 8,024,054 B2 | 9/2011 | Mairs et al. | |
| 8,099,178 B2 | 1/2012 | Mairs et al. | |
| 8,503,943 B2 | 8/2013 | Spanhake | |
| 8,628,239 B2 | 1/2014 | Merrow et al. | |
| 8,643,476 B2 | 2/2014 | Pinn et al. | |
| 8,749,959 B2 | 6/2014 | Riley et al. | |
| 8,782,619 B2 | 7/2014 | Wu et al. | |
| 8,925,358 B2 | 1/2015 | Kasper | |
| 9,130,385 B2 * | 9/2015 | Chen | ..................... H02J 7/0013 |
| 9,441,847 B2 | 9/2016 | Grohman | |
| 9,521,724 B1 | 12/2016 | Berry et al. | |
| 9,544,209 B2 | 1/2017 | Gielarowski et al. | |
| 9,602,301 B2 | 3/2017 | Averitt | |
| 9,664,400 B2 | 5/2017 | Wroblewski et al. | |
| 9,678,494 B2 | 6/2017 | Hyde et al. | |
| 9,740,385 B2 | 8/2017 | Fadell et al. | |
| 9,791,872 B2 | 10/2017 | Wang et al. | |
| 9,857,238 B2 | 1/2018 | Malhotra et al. | |
| 9,860,961 B2 | 1/2018 | Chemel et al. | |
| 9,952,573 B2 | 4/2018 | Sloo et al. | |
| 10,042,730 B2 | 8/2018 | Zebian | |
| 10,094,586 B2 | 10/2018 | Pavlovski et al. | |
| 10,223,721 B1 | 3/2019 | Bhatia | |
| 10,331,259 B2 * | 6/2019 | Hotelling | .............. G06F 3/0446 |
| 10,334,758 B1 | 6/2019 | Ramirez et al. | |
| 10,512,143 B1 | 12/2019 | Ikehara et al. | |
| 10,528,016 B2 | 1/2020 | Noboa | |
| 10,557,889 B2 | 2/2020 | Montoya et al. | |
| 10,558,183 B2 | 2/2020 | Piaskowski et al. | |
| 10,558,248 B2 | 2/2020 | Adrian | |
| 10,627,124 B2 | 4/2020 | Walser et al. | |
| 10,640,211 B2 | 5/2020 | Whitten et al. | |
| 10,672,293 B2 | 6/2020 | Labutov et al. | |
| 10,687,435 B2 | 6/2020 | Adrian et al. | |
| 10,736,228 B2 | 8/2020 | Kho et al. | |
| 10,892,946 B2 | 1/2021 | Correia e Costa et al. | |

(56) References Cited

U.S. PATENT DOCUMENTS

| | | | |
|---|---|---|---|
| 10,900,489 B2 | 1/2021 | Rendusara et al. | |
| 10,942,871 B2 | 3/2021 | Cawse et al. | |
| 10,943,444 B2 | 3/2021 | Boyd et al. | |
| 10,966,068 B2 | 3/2021 | Tramiel et al. | |
| 10,966,342 B2 | 3/2021 | Lairsey et al. | |
| 10,969,133 B2 | 4/2021 | Harvey | |
| 11,080,336 B2 | 8/2021 | Van et al. | |
| 11,088,989 B2 | 8/2021 | Gao et al. | |
| 11,222,298 B2 | 1/2022 | Abelow et al. | |
| 11,294,254 B2 | 4/2022 | Patterson et al. | |
| 2003/0020715 A1* | 1/2003 | Sakakura | G06F 30/15 345/424 |
| 2004/0236547 A1 | 11/2004 | Rappaport et al. | |
| 2005/0040247 A1 | 2/2005 | Pouchak | |
| 2007/0067063 A1 | 3/2007 | Ahmed | |
| 2007/0096902 A1 | 5/2007 | Seeley et al. | |
| 2007/0162288 A1 | 7/2007 | Springhart et al. | |
| 2008/0183316 A1 | 7/2008 | Clayton | |
| 2008/0277486 A1 | 11/2008 | Seem et al. | |
| 2009/0189764 A1 | 7/2009 | Keller et al. | |
| 2010/0025483 A1 | 2/2010 | Hoeynck et al. | |
| 2010/0131933 A1 | 5/2010 | Kim et al. | |
| 2010/0262673 A1* | 10/2010 | Chang | H04L 67/141 715/764 |
| 2011/0087988 A1 | 4/2011 | Ray et al. | |
| 2011/0125930 A1 | 5/2011 | Tantos et al. | |
| 2012/0102472 A1 | 4/2012 | Wu et al. | |
| 2012/0221986 A1 | 8/2012 | Whitford et al. | |
| 2013/0182558 A1 | 7/2013 | Orten et al. | |
| 2014/0088772 A1 | 3/2014 | Lelkens | |
| 2014/0101082 A1 | 4/2014 | Matsuoka et al. | |
| 2014/0215446 A1 | 7/2014 | Araya et al. | |
| 2014/0277757 A1 | 9/2014 | Wang et al. | |
| 2014/0358291 A1 | 12/2014 | Wells | |
| 2014/0364985 A1 | 12/2014 | Tiwari et al. | |
| 2015/0005952 A1 | 1/2015 | Sasaki et al. | |
| 2015/0081928 A1 | 3/2015 | Wintzell et al. | |
| 2015/0198938 A1 | 7/2015 | Steele et al. | |
| 2015/0234381 A1 | 8/2015 | Ratilla et al. | |
| 2016/0016454 A1 | 1/2016 | Yang et al. | |
| 2016/0062753 A1 | 3/2016 | Champagne | |
| 2016/0073521 A1 | 3/2016 | Marcade et al. | |
| 2016/0086242 A1 | 3/2016 | Schafer et al. | |
| 2016/0088438 A1 | 3/2016 | O'Keeffe | |
| 2016/0092427 A1 | 3/2016 | Bittmann | |
| 2016/0132308 A1 | 5/2016 | Muldoon | |
| 2016/0195856 A1 | 7/2016 | Spero | |
| 2016/0205784 A1 | 7/2016 | Kyle et al. | |
| 2016/0209868 A1 | 7/2016 | Hartman et al. | |
| 2016/0285715 A1 | 9/2016 | Gielarowski et al. | |
| 2016/0295663 A1 | 10/2016 | Hyde et al. | |
| 2017/0075323 A1 | 3/2017 | Shrivastava et al. | |
| 2017/0097259 A1 | 4/2017 | Brown et al. | |
| 2017/0131611 A1 | 5/2017 | Brown et al. | |
| 2017/0176034 A1 | 6/2017 | Hussain et al. | |
| 2017/0235848 A1 | 8/2017 | Van Dusen et al. | |
| 2017/0322579 A1 | 11/2017 | Goparaju et al. | |
| 2017/0365908 A1 | 12/2017 | Hughes et al. | |
| 2017/0373875 A1 | 12/2017 | Kolasa et al. | |
| 2018/0005195 A1 | 1/2018 | Jacobson | |
| 2018/0075168 A1 | 3/2018 | Tiwari et al. | |
| 2018/0089172 A1 | 3/2018 | Needham | |
| 2018/0123272 A1 | 5/2018 | Mundt et al. | |
| 2018/0202678 A1 | 7/2018 | Ahuja et al. | |
| 2018/0210429 A1 | 7/2018 | Jundt et al. | |
| 2018/0266716 A1 | 9/2018 | Bender et al. | |
| 2018/0307781 A1 | 10/2018 | Byers et al. | |
| 2018/0350180 A1 | 12/2018 | Onischuk et al. | |
| 2019/0011891 A1 | 1/2019 | Davis, II | |
| 2019/0087076 A1 | 3/2019 | Dey et al. | |
| 2019/0138704 A1 | 5/2019 | Shrivastava et al. | |
| 2019/0156443 A1 | 5/2019 | Idle | |
| 2019/0173109 A1 | 6/2019 | Wang | |
| 2019/0278442 A1 | 9/2019 | Liang | |
| 2019/0294018 A1 | 9/2019 | Shrivastava et al. | |
| 2020/0003444 A1 | 1/2020 | Yuan et al. | |
| 2020/0018506 A1 | 1/2020 | Ruiz et al. | |
| 2020/0045519 A1 | 2/2020 | Raleigh et al. | |
| 2020/0050161 A1 | 2/2020 | Noboa | |
| 2020/0133257 A1 | 4/2020 | Cella et al. | |
| 2020/0150508 A1 | 5/2020 | Patterson et al. | |
| 2020/0167442 A1 | 5/2020 | Roecker et al. | |
| 2020/0182486 A1 | 6/2020 | Haynes et al. | |
| 2020/0187147 A1 | 6/2020 | Meerbeek et al. | |
| 2020/0221269 A1 | 7/2020 | Tramiel et al. | |
| 2020/0226223 A1 | 7/2020 | Reichl | |
| 2020/0228759 A1 | 7/2020 | Ryan et al. | |
| 2020/0255142 A1 | 8/2020 | Whitten et al. | |
| 2020/0279482 A1 | 9/2020 | Berry et al. | |
| 2020/0287786 A1 | 9/2020 | Anderson et al. | |
| 2020/0288558 A1 | 9/2020 | Anderson et al. | |
| 2020/0342526 A1 | 10/2020 | Ablanczy | |
| 2020/0379730 A1 | 12/2020 | Graham et al. | |
| 2020/0387041 A1 | 12/2020 | Shrivastava et al. | |
| 2020/0387129 A1 | 12/2020 | Chandaria | |
| 2021/0073441 A1 | 3/2021 | Austern et al. | |
| 2021/0081504 A1 | 3/2021 | Mccormick et al. | |
| 2021/0081880 A1 | 3/2021 | Bivins et al. | |
| 2021/0123771 A1 | 4/2021 | Vega et al. | |
| 2021/0157312 A1 | 5/2021 | Cella et al. | |
| 2021/0182660 A1 | 6/2021 | Amirguliyev et al. | |
| 2021/0248286 A1* | 8/2021 | Poluri | G06F 30/13 |
| 2021/0096824 A1 | 11/2021 | Stump et al. | |
| 2021/0366793 A1 | 11/2021 | Hung et al. | |
| 2021/0383041 A1 | 12/2021 | Harvey et al. | |
| 2021/0400787 A1 | 12/2021 | Abbo et al. | |
| 2022/0058306 A1 | 2/2022 | Mabote | |
| 2022/0070293 A1 | 3/2022 | Harvey et al. | |
| 2022/0156653 A1 | 5/2022 | Abelow | |
| 2023/0180420 A1 | 6/2023 | Harvey et al. | |
| 2023/0228437 A1 | 7/2023 | Bonvini et al. | |

FOREIGN PATENT DOCUMENTS

| | | |
|---|---|---|
| CN | 206489622 U | 9/2017 |
| JP | 6301341 B2 | 3/2018 |
| WO | 2008016500 A3 | 3/2008 |
| WO | 2012019328 A1 | 2/2012 |

OTHER PUBLICATIONS

Kalagnanam et al., "A System For Automated Mapping of Bill-of-Materials Part Numbers", KDD '04: Proceedings of the tenth ACM SIGKDD international conference on Knowledge discovery and data mining, Aug. 2004, pp. 805-810.

Mouser Electronics News Release, Aug. 16, 2018.

Ouf et al., Effectiveness of using WiFi technologies to detect and predict building occupancy, Sust. Buildi. 2, 7 (2017).

RadioMaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi:10.3390, Mar. 12, 2018.

Siano, P, "Demand response and smart grids—A survey", Renewable and Sustainable Energy Reviews 30 (2014) 461-478.

Wang et al., "A Practical Multi-Sensor Cooling Demand Estimation Approach Based on Visual Indoor and Outdoor Information Sensing," Sensors 2018, 18, 3591; doi:10.3390.

Yegulap, Serdar, "What is LLVM? The power behind Swift, Rust, Clang, and more," Infoworld, Mar. 11, 2020.

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

Hagentoft et al. Full Reference, Assessment Method of Numerical Prediction Models for Combined Heat, Air and Moisture Transfer in

(56) References Cited

OTHER PUBLICATIONS

Building Components: Benchmarks for One-dimensional Cases, Journal of Thermal Env. & Bldg. Sci., vol. 27, No. 4, Apr. 2004.
U.S. Appl. No. 15/995,019 (7340.2.2) Office Action mailed Jul. 26, 2019.
U.S. Appl. No. 15/995,019 (7340.2.2) Office Action mailed Oct. 8, 2020.
U.S. Appl. No. 15/995,019 (7340.2.2) Office Action mailed Apr. 15, 2020.
Amin, Massoud, "Toward self-healing energy infrastructure systems," IEEE Computer Applications in Power 14.1 (2002): pp. 20-28.
Gou, Wenqi, and Mengchu Zhou, "An emerging technology for improved building automation control," 2009, IEEE International Conference on Systems, Man and Cybernetics, IEEE, 2009, pp. 337-342.
Gungor et al., "Industrial Wireless Sensor Networks: Challenges, Design Principles, and Technical Approaches," IEEE Transactions on Industrial Electronics, vol. 56, No. 10, Oct. 2009.
Zigbee, Wikipedia, p. 1, (Year:2018).

\* cited by examiner

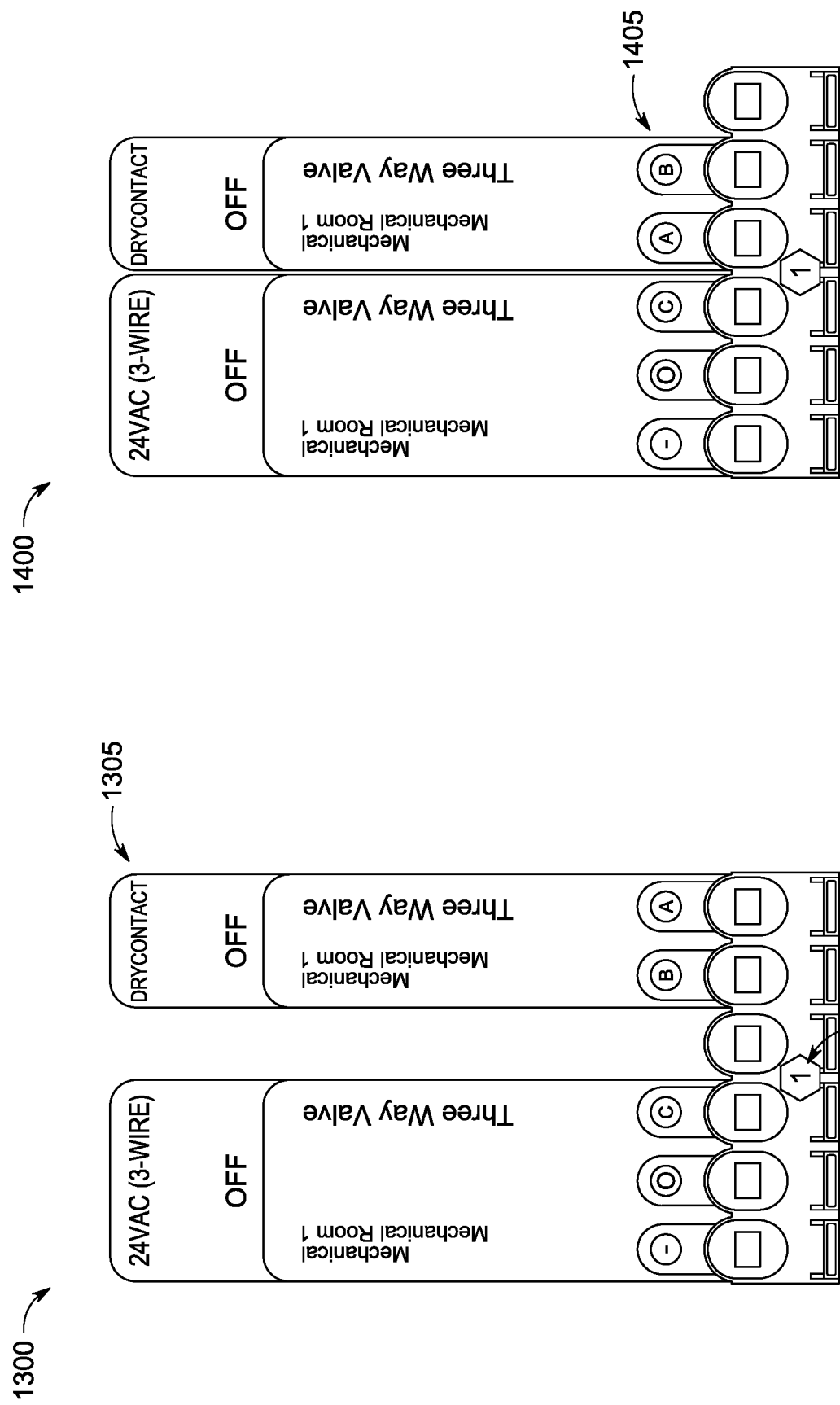

CONTROL SYSTEM HAVING AN ADJACENT ELECTRONIC DISPLAY FOR AUTO LABELING AND GUIDED WIRING

RELATED APPLICATION

The present application hereby incorporates by reference the entirety of, and claims priority to, U.S. Provisional Patent Application Ser. No. 63/070,460 filed 26 Aug. 2020.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to creating guided wiring systems. More specifically, to using a controller with an adjacent electronic display to input information concerning the wiring display, and then being able to display both the wiring and the information concerning the wiring simultaneously.

BACKGROUND

Today's "smart buildings" aren't smart at all—just connected. Expensive cloud add-ons that promise to "un-dumb" your control system can only provide low-value results and reduced reliability, all at the cost of more integration effort. Different parts of the building, down to individual pieces of equipment are all distinct systems that understand very little, if anything, about the rest of a building unless told explicitly using complex tagging methods. Each system still must be told about all the other systems, but the building itself knows very little in-toto. For example, wiring diagrams take hours to create, as many unconnected systems must be considered. Further, if a problem comes up when building a structure that requires that a wired device must be moved, the wiring diagram must be recreated from scratch, which can entail quite a bit of effort. When wiring diagrams are changed, the terminals that the devices are to be wired to may also need to be changed as well, which also may entail completely redoing the wiring diagrams from scratch.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, some technologies described herein describe a controller with a housing; computer hardware and a programmable memory attached to the housing; a moveable interactive screen attached to the housing controlled by the computer hardware and programmable memory; a side surface of the housing with a controller terminal attachment. The moveable interactive is able to display representations of the devices that the controllers are wired to; or devices that the controllers will be wired to. Users can use the moveable interactive display to label the devices, or modify the devices. This screen that shows the controller wiring can be moved such that the controller wiring is displayed, or moved such that the controller wiring is hidden.

In embodiments, a controller is described, comprising: a housing; computer hardware and a programmable memory attached to the housing; a moveable interactive screen attached to the housing controlled by the computer hardware and programmable memory; a side surface of the housing with a controller terminal attachment; the moveable interactive screen operationally able to display a representation of the controller terminal attachment; the controller operationally able to allow a user to define a parameter of the representation of the controller terminal attachment using the moveable interactive screen; the controller operationally able to allow the user to label the parameter, creating a labeled parameter using the moveable interactive screen; and the moveable interactive screen able to move such that the controller terminal attachment, the representation of the controller terminal attachment displayed on the moveable interactive screen, and the labeled parameter displayed on the moveable interactive screen can be seen simultaneously.

In embodiments, an updater is disclosed which is operationally able to update the representation of the controller terminal attachment on the moveable interactive screen when the controller terminal attachment is modified.

In embodiments, a resource with a location, is disclosed wherein the controller is operationally able to use the moveable interactive screen to allow a user to define the resource as being attached to a terminal within the controller, the moveable interactive screen is operationally able to accept resource location data, and wherein the computer hardware and the programmable memory are able to at least partially design a wiring diagram between the resource and the controller terminal attachment.

In embodiments, the resource location data further comprises a drawing of a designated space.

In embodiments, the drawing of the designated space comprises controller location.

In embodiments, a removable module, and wherein the controller terminal attachment comprises at least a portion of the removable module.

In embodiments, the moveable interactive screen is operationally able to display a representation of the removable module.

In embodiments, a controller is disclosed comprising: a housing with an inside and an outside; computer hardware and a programmable memory attached to the housing; a moveable interactive screen attached to the housing configurable such that the housing inside is displayed in a moveable interactive screen position and that the housing inside is hidden in another moveable interactive screen position, the controller operationally able to display images on the moveable interactive screen; a controller attachment on an inside surface of the housing operationally able to connect with a module attachment; the module attachment operationally able to be connected to a controller terminal attachment such that the controller attachment is operationally able to be connected to the controller terminal attachment through the module attachment; and the controller is operationally able to display, on the moveable interactive screen, a representation of the controller terminal attachment, a representation of a module operationally able to be attached to the controller attachment, and a representation of the device.

In embodiments, the moveable interactive screen is operationally able to allow a user to define a representation of a device, the device operationally able to connect to the controller terminal attachment.

In embodiments, the representation of the device comprises a label indicating a name of the device.

In embodiments, the representation of a device is defined to require a controller terminal attachment of a specific type.

In embodiments, the controller is operationally able to modify the controller terminal attachment to the specific type.

In embodiments, a display of the moveable interactive screen comprises multiple representations of terminal attachments and wherein the display of the moveable interactive screen is operationally able to take input from a user to move a device representation from a first terminal attachment representation to a second terminal attachment representation.

In embodiments, the controller is operationally able to instruct the moveable interactive screen to modify the representation of the device when the moveable interactive screen is in position such that the housing inside is hidden.

In embodiments, the moveable interactive screen is operationally able to display the representation of the device when the movable interactive screen is in position such that the housing inside is displayed.

In embodiments, a building controller system with a processor and memory, is disclosed, comprising: a controller, the controller with an inside and an outside, the controller with device connections mounted on the inside; the device connections operationally able to couple to devices; a moveable screen operatively coupled to the controller, the moveable screen operationally able to move such that the inside of the controller is displayed and move such that the inside of the controller is hidden; the controller configured to display, on the moveable screen, representations of devices attached to the controller; and the controller configured to modify, on the moveable screen, the representations of the devices attached to the controller, the modification used for controlling subsequent operation and/or functionality of the device connection.

In embodiments, a module is operationally able to couple to the controller and is operationally able to couple to the device, such that the controller is operationally able to couple to the device through the module.

In embodiments, a modification for controlling subsequent operation of the device connection is disclosed, comprising changing an expected device coupled to the device connection.

In embodiments, a modification for controlling subsequent operation of the device connection comprises changing functionality of the device connection to match requirements of the device.

In embodiments, the representations of devices attached to the controller comprises device name, device location on the controller, or a device operating characteristic.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

FIGS. 11-14 are partial screenshots with which some described embodiments can be implemented.

Figure 1:
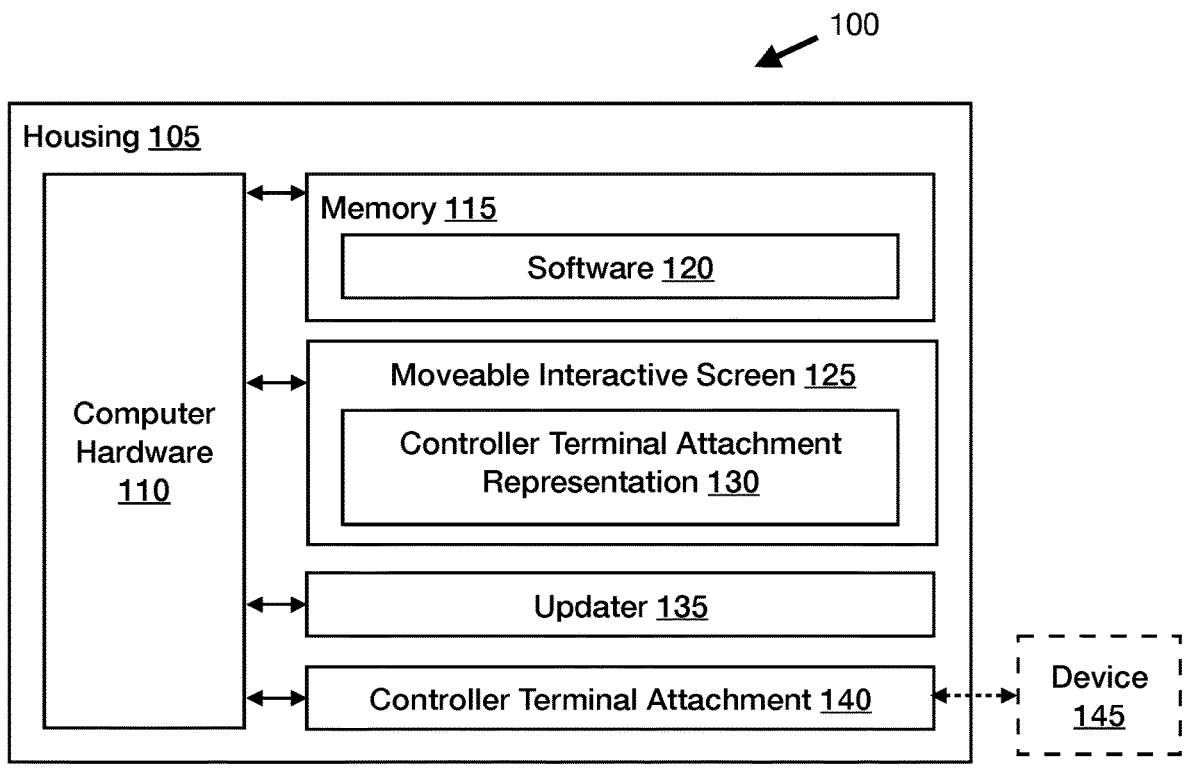
FIG. 1 depicts a functional block diagram showing an exemplary embodiment of some features of a controller in conjunction which some described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to a control system having an adjacent electronic display for auto labeling and guided wiring. Described embodiments implement one or more of the described technologies.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

When originally designing and building a structure, the creation process can include designing the structure using a portion of the controller system that will eventually control the various devices (such as HVAC equipment, sensors, safety systems, etc.). In such a system, the specific wiring details and other characteristics about the devices will be input into the controller system during the design process. However, when constructing a building, no matter how much work went into the original design there is always the possibility that a device will need to be moved, or that a device is not available and needs to be substituted for another device. Rather than being forced to recreate an entire wiring diagram, the controller where the device is wired can display the current controller wiring on a display screen, allowing a user to change devices on the screen, modify the nature of the control terminals, etc. The controller can also change the nature of its terminals, as required by the chosen devices. When the building has been finished, the controller display, when open, may show the devices attached to the controller, with labels such as names, specific information about the wiring terminals, labels, etc. When the display screen is open, the actual wiring can be seen in the controller.

FIG. 1 depicts an exemplary system that can be used for embodiments described herein. Not every embodiment has every disclosed item; embodiments may have many more items than those disclosed. A control system block diagram that has an adjacent electronic display for auto labeling and guided wiring is shown at 100. A controller enclosed in housing 105 uses computer hardware 110 and software 120 stored in memory 115 to display various pictures on a moveable interactive screen 125. The moveable interactive screen 125 is operatively coupled to the controller such that when the movable interactive screen in at least one position, both a display of the moveable interactive screen and the device connections 105B can be seen simultaneously.

In some embodiments, the moveable interactive screen 125 is operatively coupled to the controller such that a module attachment 110A and the display of the moveable interactive screen can be seen simultaneously. The housing also has at least one controller terminal attachment 140 attached to a side inner surface of the housing that allows the controller to connect to a device 145. This device may be a piece of equipment that can control state of a space that the controller would be in. States that can be controlled by a device comprise, without limitation, lighting, heat, noise, humidity, VOC, CO2 concentration, entertainment equipment states, security states (such as doors locked or unlocked, who is allowed in the building or a section of a building, or a space at a given time), radiant heat, and so on. Sensors may also be connected to the controller, as well as other resources. The controller 100 can send messages to and receive messages from the device 145 through the controller terminal attachment 140.

The controller also comprises a moveable interactive screen 125. The moveable interactive screen 125 may be any sort of display that allows a user to interact with the controller, such as a touch screen, a screen with a mouse, keyboard, or other input device, a spoken word interface that can be used without sight, a braille interface, etc. Software 120 stored in memory 115 may employ any combination of the technologies described herein. Digital representations on the moveable interactive screen can be derived from any technology that takes an image of a building, of a controller panel, etc., and turns it into a digital representation. So, for example, any of the imaging technologies described herein or known by those of skill in the digital arts can be used to generate the digital representations shown on the moveable interactive screen 125. Without limitation, the moveable interactive screen 125 can be hinged, such that the moveable interactive screen and the controller form a clamshell when closed; the moveable interactive screen can be attached at a corner, such that the moveable interactive screen can swing up 90 degrees or more from the controller; the moveable interactive screen can be hinged to a side of the controller; the moveable interactive screen can raise up to display the insides of the controller, and slide down, to hide the insides of the controller.

Figure 1A:
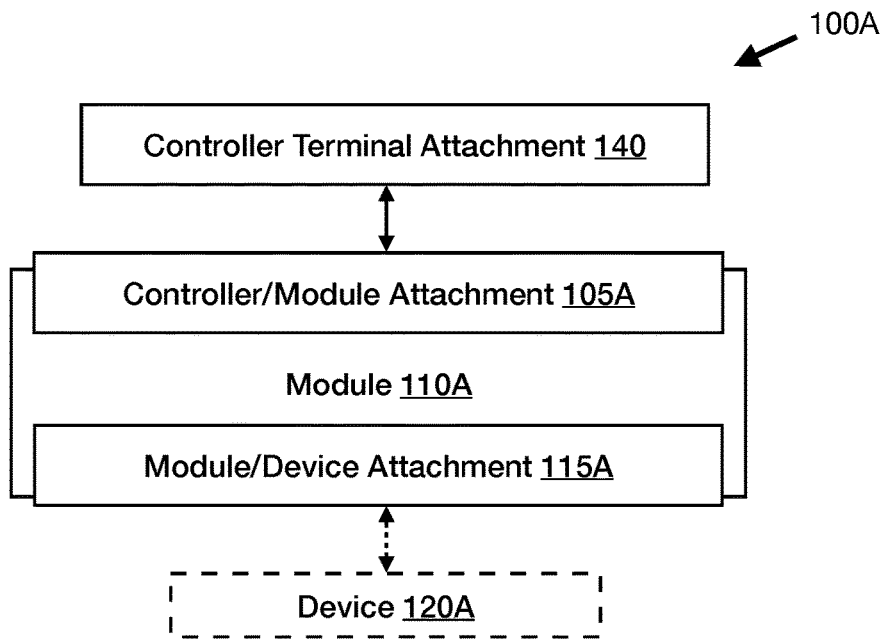
FIG. 1A depicts a functional block diagram showing an exemplary embodiment of a controller attachment-module interface.

FIG. 1A depicts a functional block diagram 100A showing an exemplary embodiment of a controller attachment-module interface. A controller terminal attachment 140 may be attached to a module 105A. The module 105A may have a controller/module attachment 105A which attaches to the controller terminal attachment. The module 105A may also have a module/device attachment 115A which directly attaches to a device 120A. The device 120A, in such instances, communicates with the controller 100 through the module/device attachment 115A, the modules 110A and the controller/module attachment 105A, which, in turn, communicates with the controller terminal attachment 140.

Figure 1B:
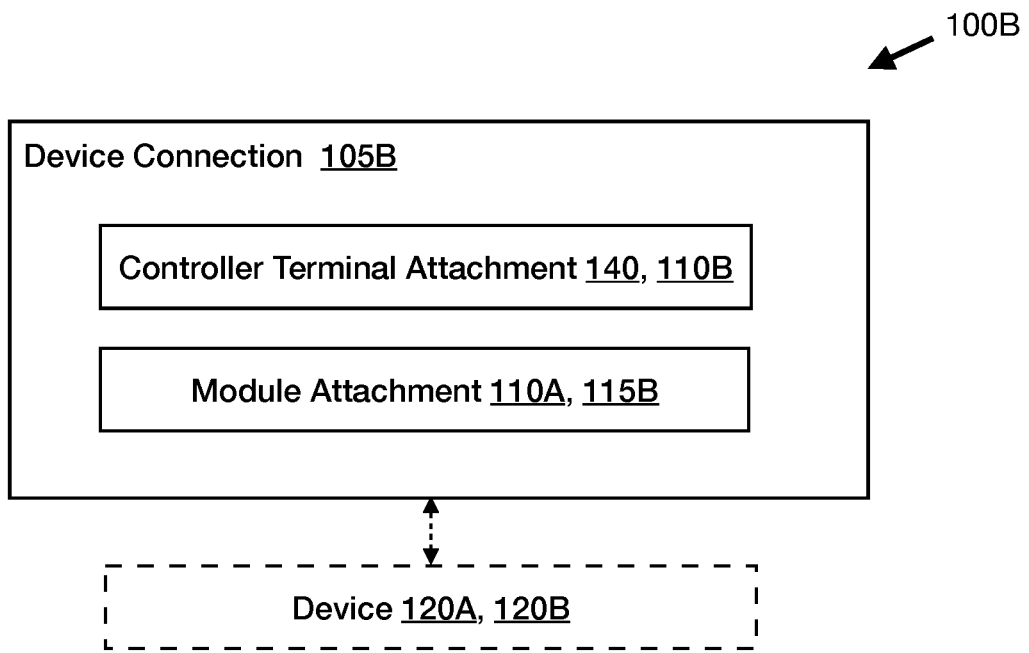
FIG. 1B depicts a functional block diagram depicting device connection embodiments.

FIG. 1B depicts a functional block diagram 100B depicting device connection embodiments. A device connection 105B is a connection that connects a device to a controller. For example, the device connection may be mounted on the inside of the controller. The device connection may be mounted on a module that itself is mounted inside the controller, etc. This connection may be a controller terminal attachment 110B that connects a device 120B directly to a controller. It may also be a module attachment 115B that connects a device 120B to a module 110A, which then connects through a controller/module attachment 105A to a controller terminal attachment 140, 110B.

Figure 2:
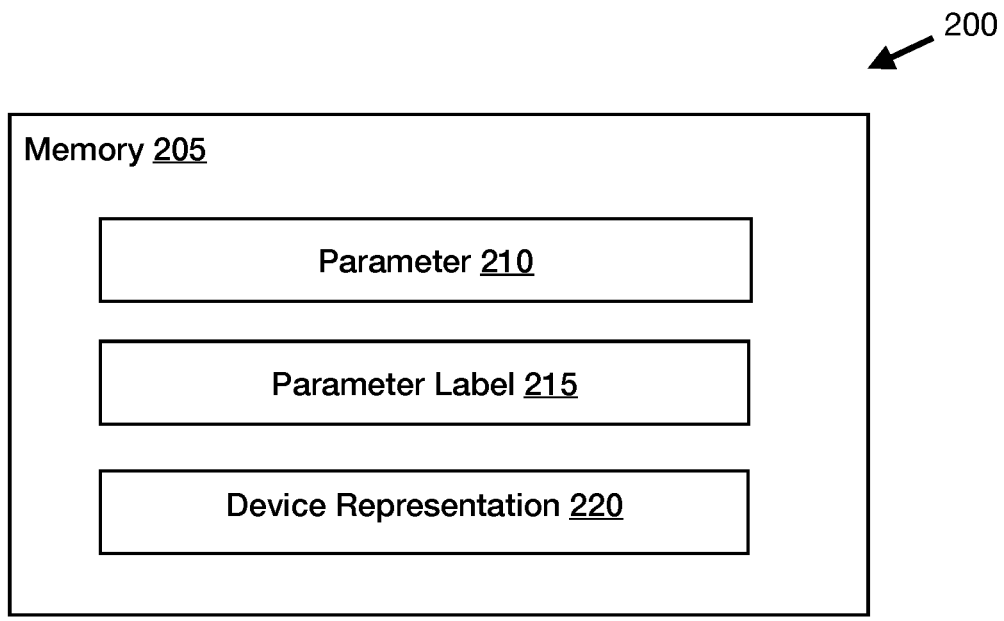
FIG. 2 depicts a functional block diagram showing an exemplary embodiment of some features of a memory in conjunction with which some described embodiments can be implemented.

FIG. 2 depicts a functional block diagram 200 showing an exemplary embodiment of some features of a memory. Memory 205 may comprise a parameter 210. This parameter 210 may be associated with a representation 130 of a device 145 that may be connected to a controller terminal attachment 140. For example, the parameter may comprise a name of a device, e.g., a variable speed pump (e.g., FIG. 6 at 605). The memory 115 may also comprise a parameter label 215. This parameter label may be information about the parameter 210, such as a name, a characteristic, such as a pin type (e.g., the type of protocol that will be expected on a specific pin), a location, etc. When a device has many possible configurations, the specific configuration or a portion of the specific configuration may be stored in this parameter label. For example, a device (such as a variable speed pump 605) may run on different protocols, viz., BACnet, 0-20 mA, etc. The specific protocol may be stored in a parameter label. When a device has multiple wires connected to the controller, each wire may follow a different protocol, such as (0), (+), (−), (C), (R), etc. The specific protocol for the specific wire on a controller may also be stored as a parameter 210, with the parameter label 215 e.g., indicating the type of protocol that can be displayed on, e.g., a Moveable Interactive Screen 125.

This will modify subsequent operation of the controller terminal attachment 140 or module attachment 110A as the controller will pass messages to the controller terminal attachment 140 or module attachment 110A that will be appropriate for the current and/or newly-defined parameter. The memory may also comprise a device representation 220. This device representation may be a representation of a device 145 that is attached to the controller, or a device that may be attached to the controller. This device representation may comprise any device operating characteristics, such as the protocol the device will use to talk to the controller, the wiring requirements; the number of wires the device requires, the specific codes issued by the unit model for various situations, the current and voltage accepted received at various times, etc. In embodiments, the controller 100, e.g., through memory, has access to databases of the devices represented by the device representation 220 including wiring diagrams and protocols, such that the controller can automatically create a wiring diagram that can be used to wire the building and the controller.

Figure 3:
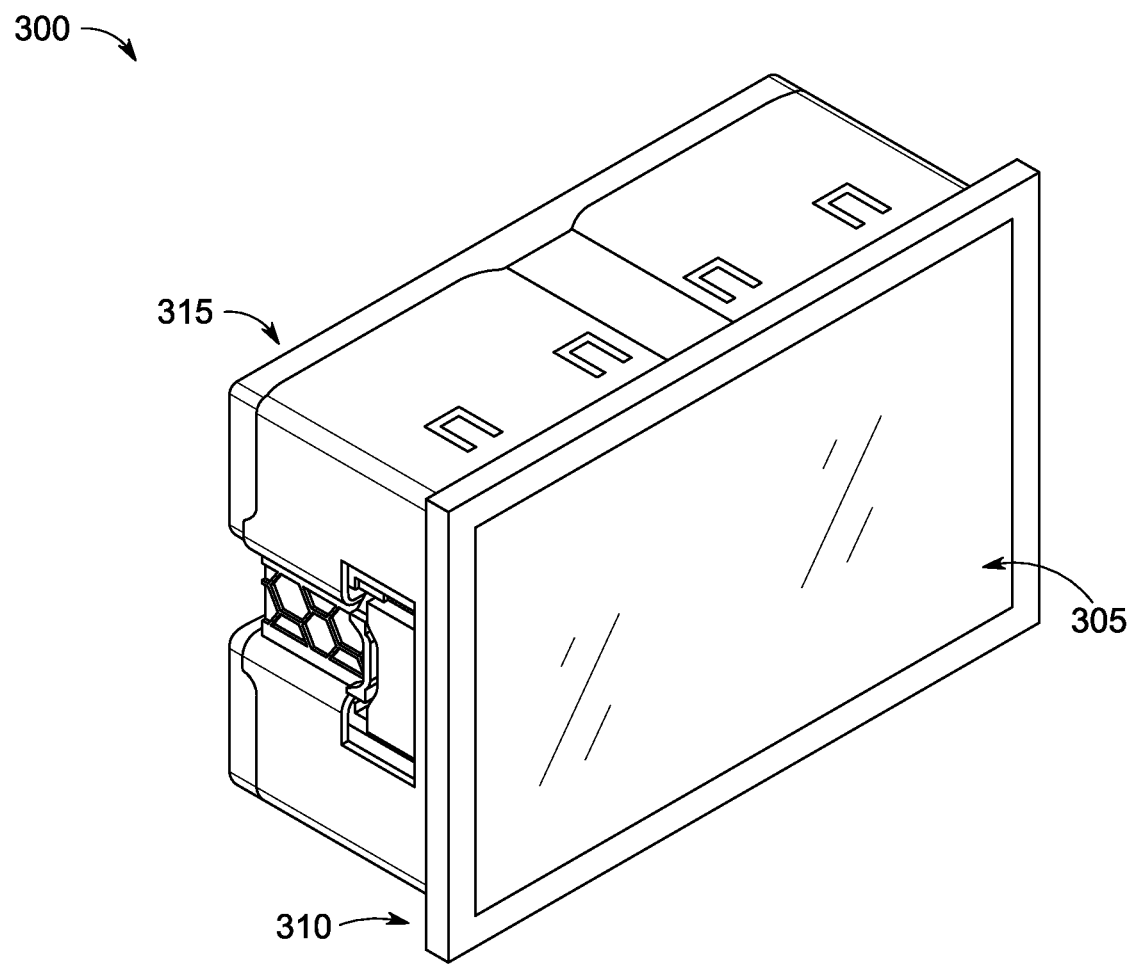
FIG. 3 is a left side perspective view of a controller when the moveable interactive screen is in a closed position.

FIG. 3 is a left side perspective view 300 of an illustration of a controller when the moveable interactive screen 125, 305 is in the closed position such that wiring inside of the controller cannot be seen. A housing 315 can be made from plastic or any other appropriate material, or any combination of appropriate materials and with any number of other separable parts, if any. The housing may have (among other features) a power port, a processor and memory, wired internet hardware (viz., an ethernet connection), wireless hardware (viz., a wireless connection and interface), and/or any other suitable components. The screen may have a lip 310, such that the controller can be inset into a wall with only the screen being displayed.

Figure 4:
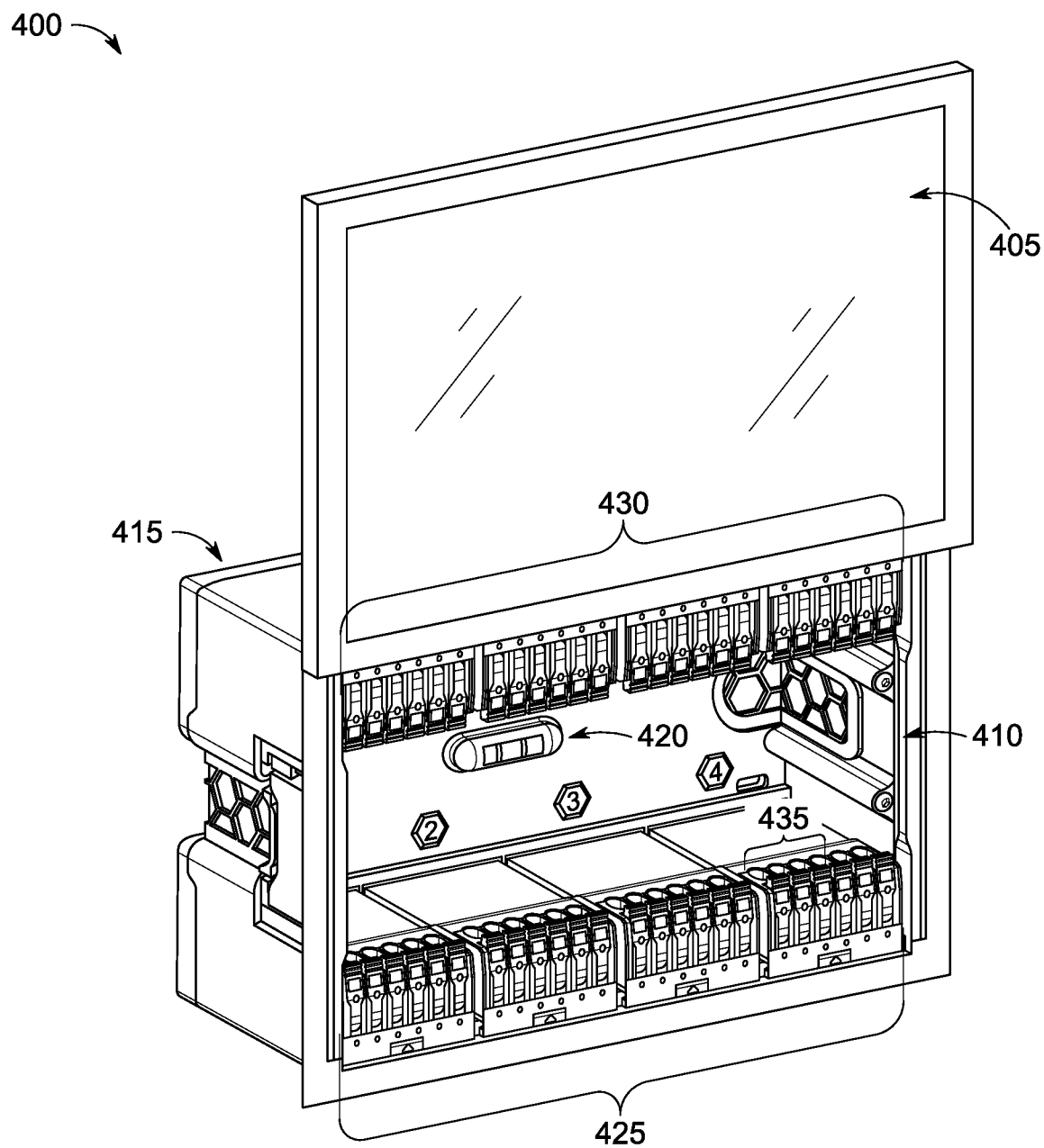
FIG. 4 is a left side perspective view of a controller when the moveable interactive screen is in the open position.

FIG. 4 is a left side perspective view 400 of an illustration of a controller when the moveable interactive screen 405 is open, showing the inside 410 and outside 415, such that wiring 425, 430 inside of the controller can be seen and modified. The moveable interactive screen 405 can be used to modify the digital representation of the controller, such that the controller understands what devices will be attached to it, and what characteristics those devices are expected to have. For example, a device could be wired to one or more of the module/device attachments 435. In some implementations, devices 145 are wired directly to controller terminal attachments 140. Individual modules with module/device attachments 435 can easily be accessed with the screen 405 open. A level 420, which can be used to make installation easier, may also be included.

Figure 5:
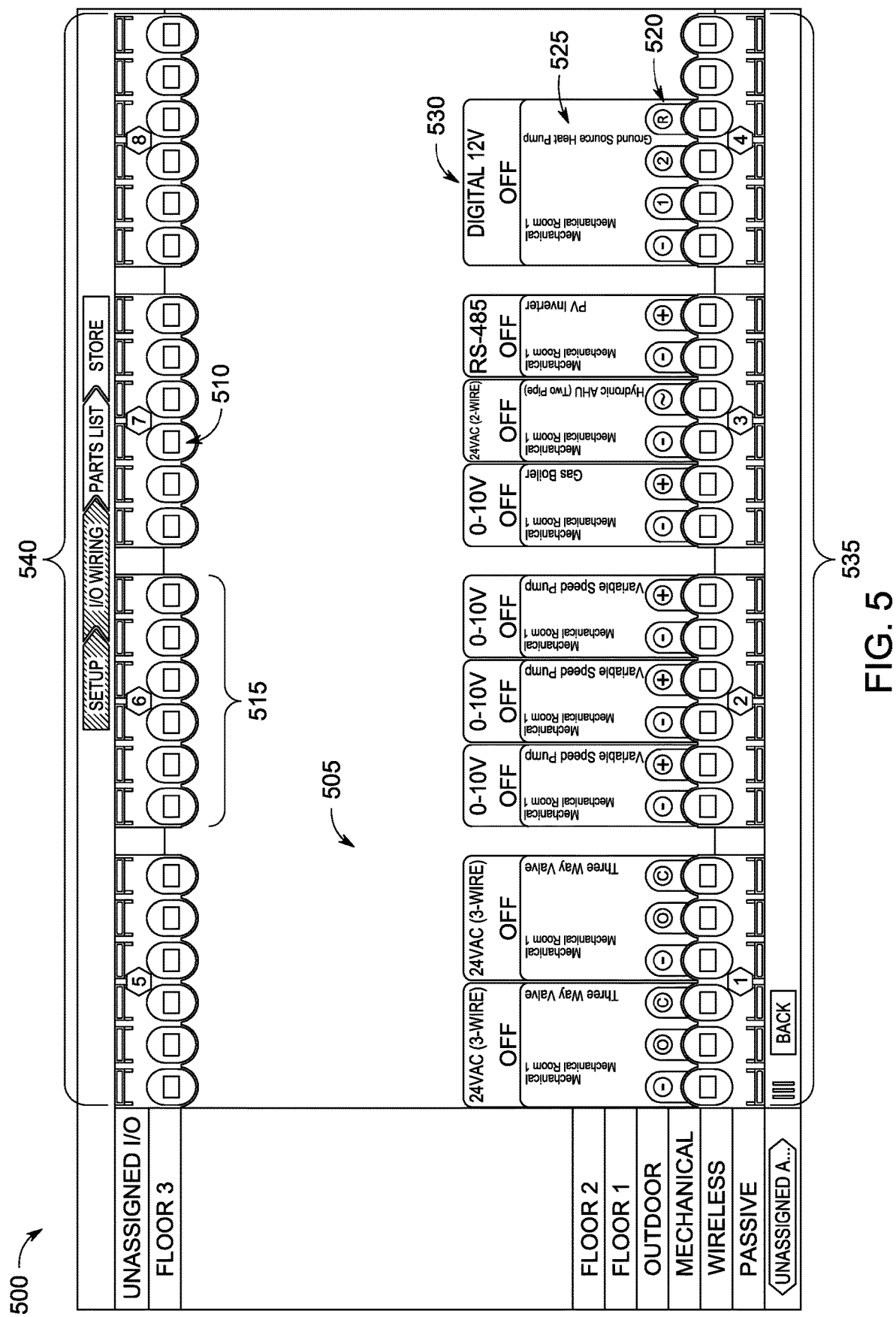
FIGS. 5 and 6 are a screenshots showing an illustrative representations of controller terminal display screens.

With reference to FIG. 5, a screen display 500 shows an example of a display of the controller wiring such as might be displayed on a moveable interactive screen 125. Here, there are a total of forty-eight representations of device connections arranged as they are arranged in the physical controller 400—twenty-four at the top 540, representing the twenty-four device connections 430 at the top of the inside of the controller; and twenty-four representations of device connections at the bottom of the screen 535, representing the twenty-four device connections 425 at the bottom of the inside of the controller. The controller has representation of a terminal attachment 130 that is not attached to a device shown at 510. A representation of a terminal attachment 130 that is attached to a device is shown at 520—a ground source heat pump 525. As can be seen, the furthest right terminal attachment (of four) of the heat pump is of type (R) 520, and is a wire for digital 12 v protocol 530. This device would (or would be expected to) be wired to the controller at the lower right pins 19-22 (counting from the left) as shown at 435. In this illustrative example, the controller has forty-eight terminal attachments (also called wiring pins.) This is purely for illustrative purposes. Controllers with fewer and with more terminal attachments are also envisioned.

Figure 6:
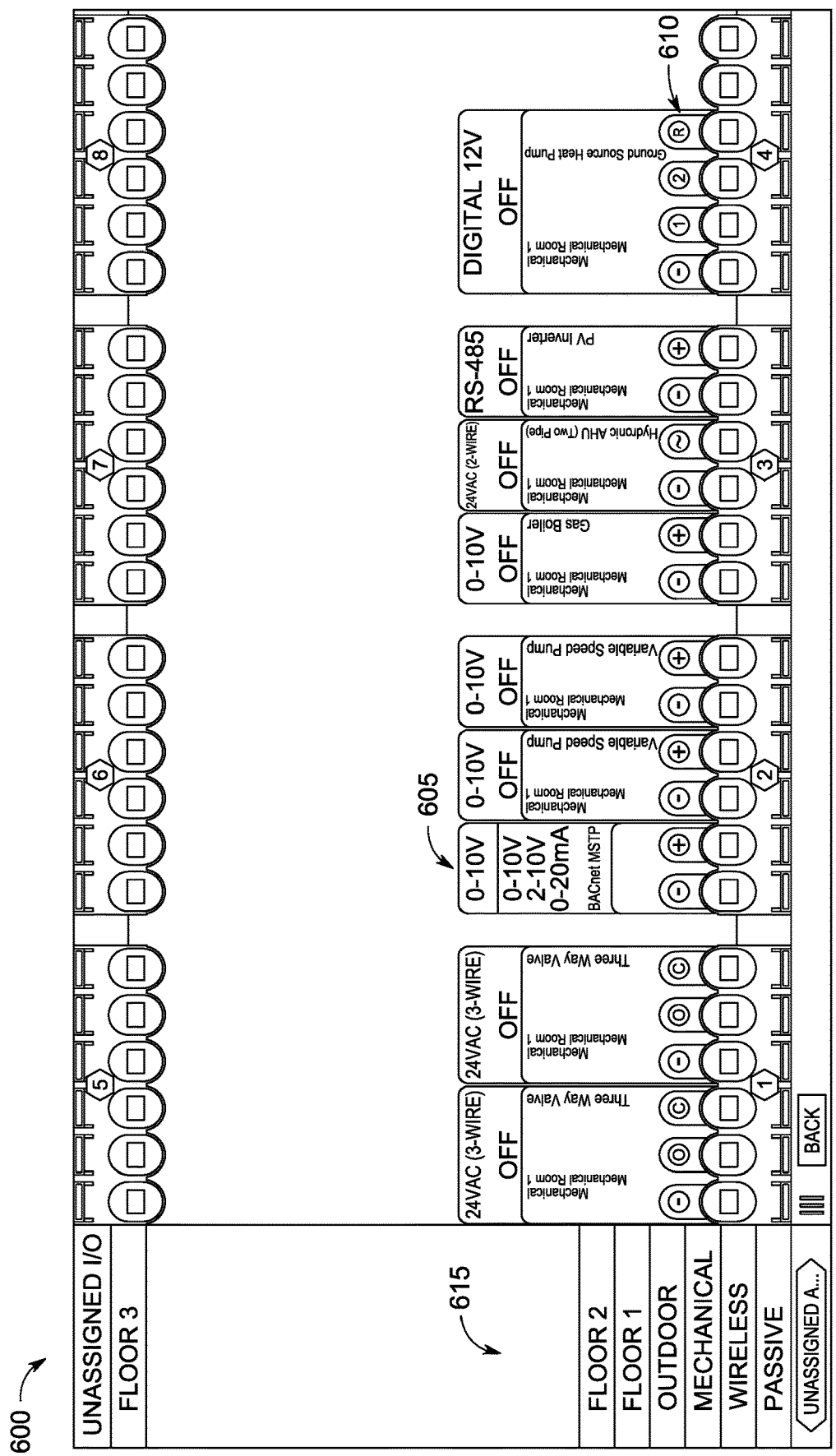

FIG. 6 is an illustrative screen display 600 of the controller wiring such as might be displayed on a moveable interactive screen 125. The devices are displayed with a series of labels, such as their name (such as Ground Source Heat Pump), their state (on, off, some intermediate state), their protocol (such as 0-10V, Digital 12V, etc.), and the nature of the device connection 610 (−, +, 1, 2, R, etc.) If a user needs to modify a device, the user may select a device. Selecting a device may display a menu 605 with protocols/interfaces available for that device. In the displayed embodiment, the device currently is 0-10V, but can be changed to 2-10 v, 0-20 mA, or BACnet MSTP. These devices do not all have the same pin configuration; in some embodiments the pins may be changed to meet the new device needs. These changes may be automatic, may be done by the controller at the request of a user, etc. This change may be by software that controls the hardware associated with the controller terminal attachments 140 (sometimes called pins). If there are devices in the structure that have not been assigned to a controller location they may be listed in a screen location such as the panel 615.

Figure 7:
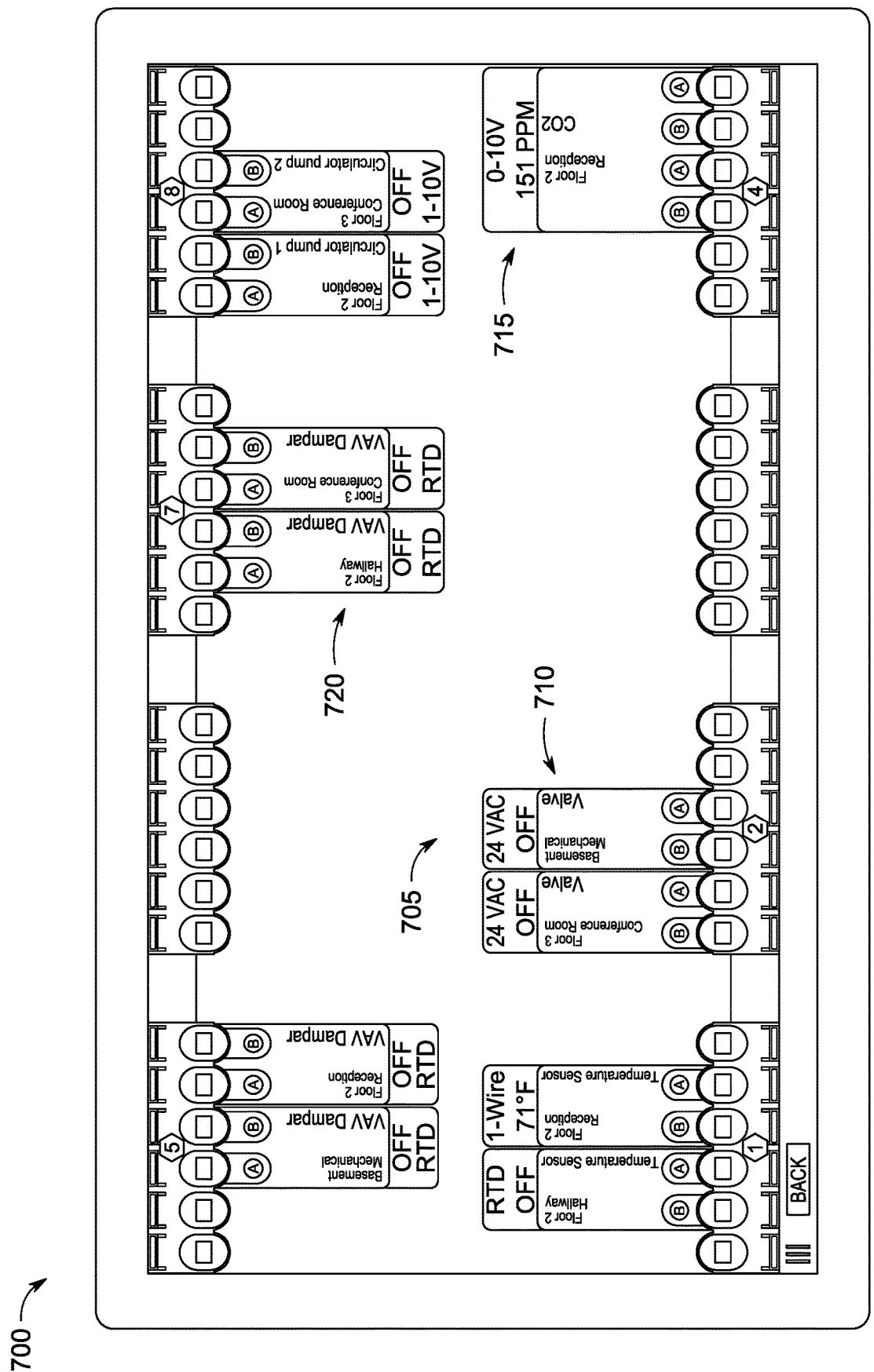
FIG. 7 depicts an exemplary screenshot that displays controller-device wiring.

FIG. 7 is an illustrative display of a front view of a controller 700 with a moveable interactive screen 125 in a closed position such that the inside of the controller is hidden. The moveable interactive screen on the controller can be configured to display representations of devices attached to the controller after the controller and the devices have been installed, such that the current values of the devices are displayed. In the illustrative embodiment, a screenshot 705 shows eleven devices that are wired to the controller, along with their names, e.g., 710 (Valve, in the immediate example), the state they are in, e.g., 715—on, off, their specific value, etc. In the illustrative example, a CO2 sensor 715 is recording 151 PPM. The location 720 of the connection of the device on the controller is also shown graphically. The location 720 may include several hierarchal indicators. The illustrative example shows two layers of hierarchy, the floor (Floor 2), and the location within the floor (Hallway). Other hierarchies also fall within the scope of this disclosure. In some instances, the display discloses devices that are to be wired to the controller, e.g., during construction, when a device is swapped out with another device, when a new device is added, etc.

Figure 8:
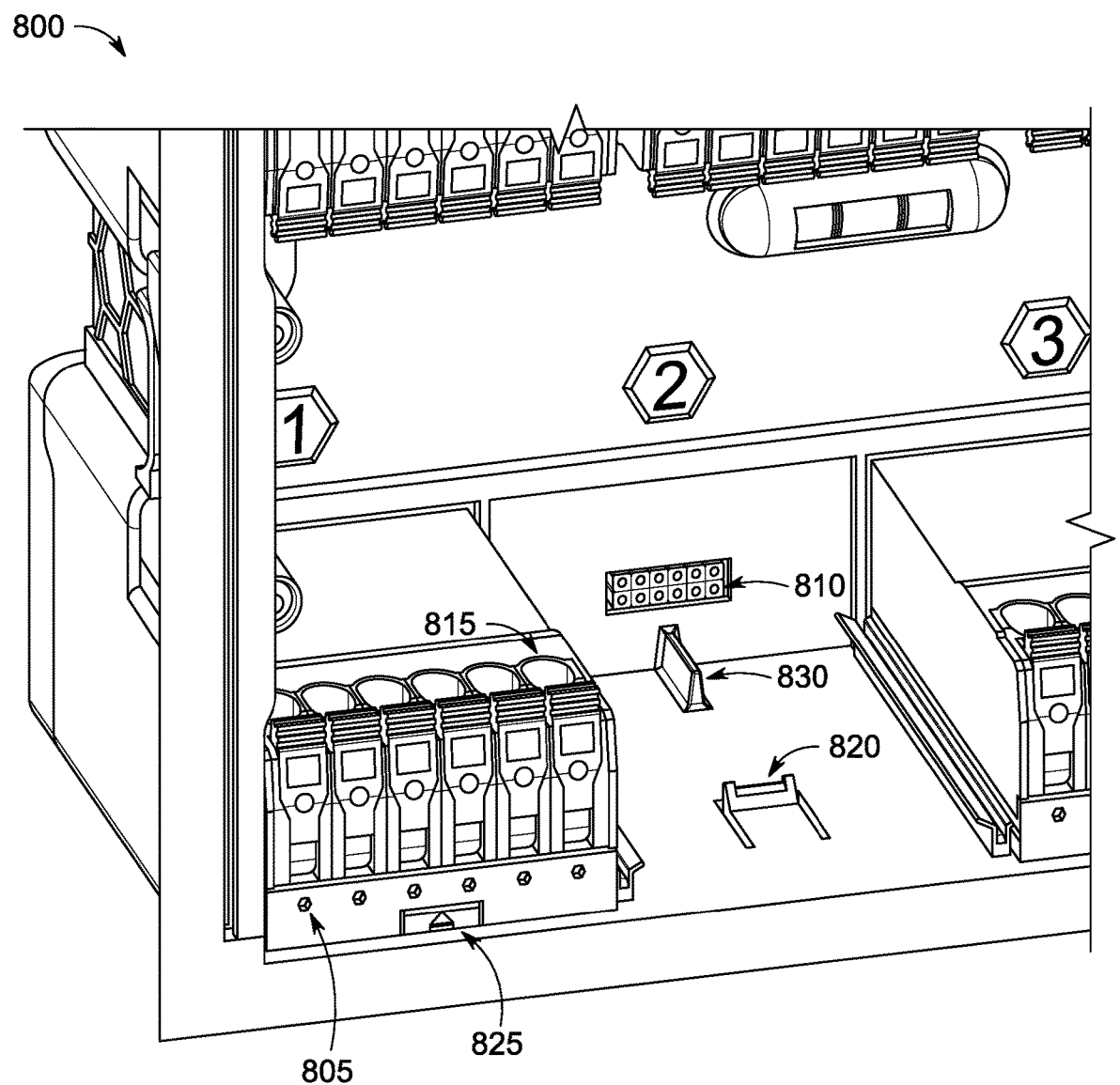
FIG. 8 is a front side partial view of controller-module coupling.

FIG. 8 shows an illustrative example of a spring release mechanism that attaches to a module to a controller. When a module 805 is slid into the controller 800 there are two springs that become loaded, a front spring (not shown) and a back spring 830. When the module slides in, the module catches on the hook tab 820, and loads the front spring and the ejector button 825 of the module. At this time, the back spring of the module also becomes loaded by the bar 830. The bar 830 pushes the back spring as the module is pushed into place. When a module ejector button 825 is pushed, it moves the hook tab 820 out of the way, and the force from the back spring pushes the module 805 out of its location in the controller. Connectors 810 connect a module to the controller. A module attachment 815 attaches a device wire to the module, and through the module, to the controller 100.

Figure 9:
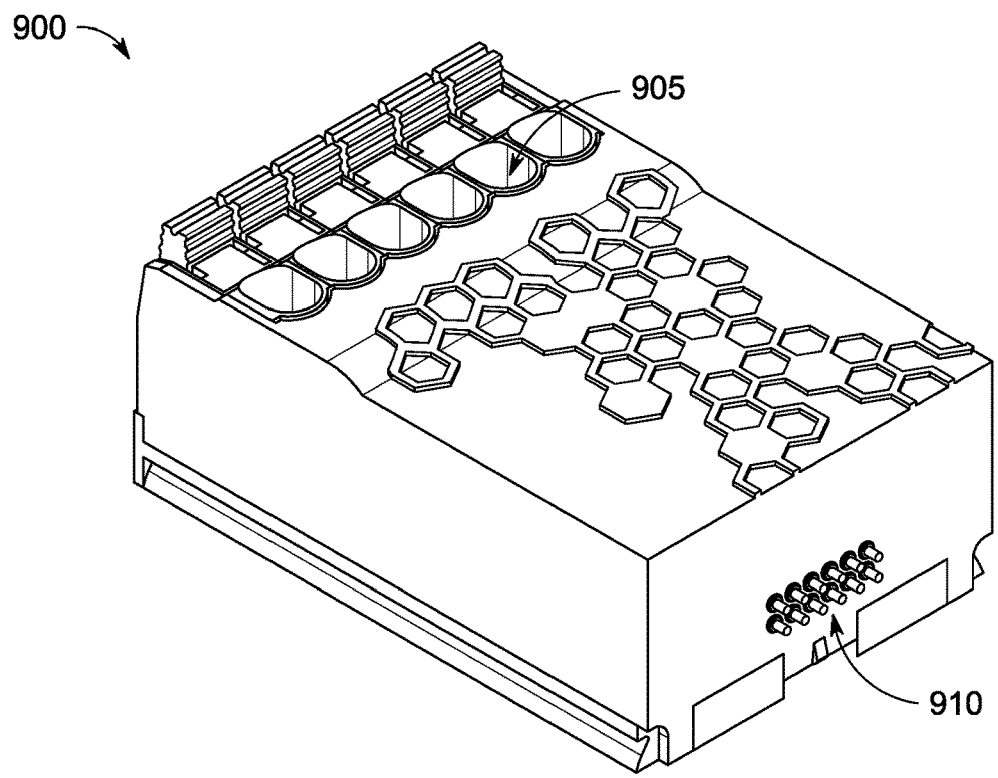
FIGS. 9 and 10 are perspective drawings of an illustrative module.

FIG. 9 shows a perspective drawing of an illustrative module. The illustrative module shows a set of module attachment connectors 110A, 910 at one end of a module. These connectors connect the module 900 to a controller, e.g., 810, allowing messages to be passed and received between the controller 800 and a device 145 attached to it though the module 900. Twelve pogo pins are shown in the module-controller attachment 810 here, but different numbers and different types of attachments can be used. The connectors 910 from the module interfaces with the connector attachment 810; these might directly connect to a controller motherboard (comprised of the computer hardware (which includes a processor) 110 and memory 115, or might connect indirectly to the controller motherboard.

Figure 10:
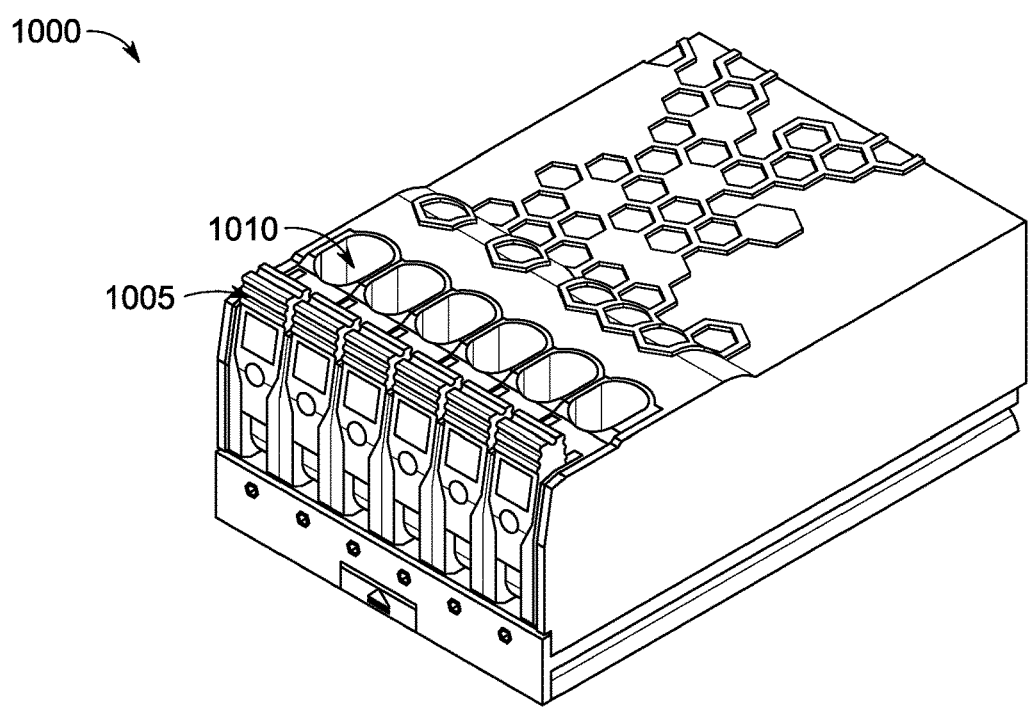

FIG. 10 is a perspective drawing of a front view of a module. Module/device attachments 115A may be built with lever locks to lock a wire in place. These may comprise tool-less lever lock connectors that securely connect almost any wire, from 10 to 26 gauge. With a tool-less lever lock, a lever can be pulled down 1005; a wire can then be inserted at 1010. Pulling the lever 1005 up will then pinch/secure the wire into the contact.

Figure 12:
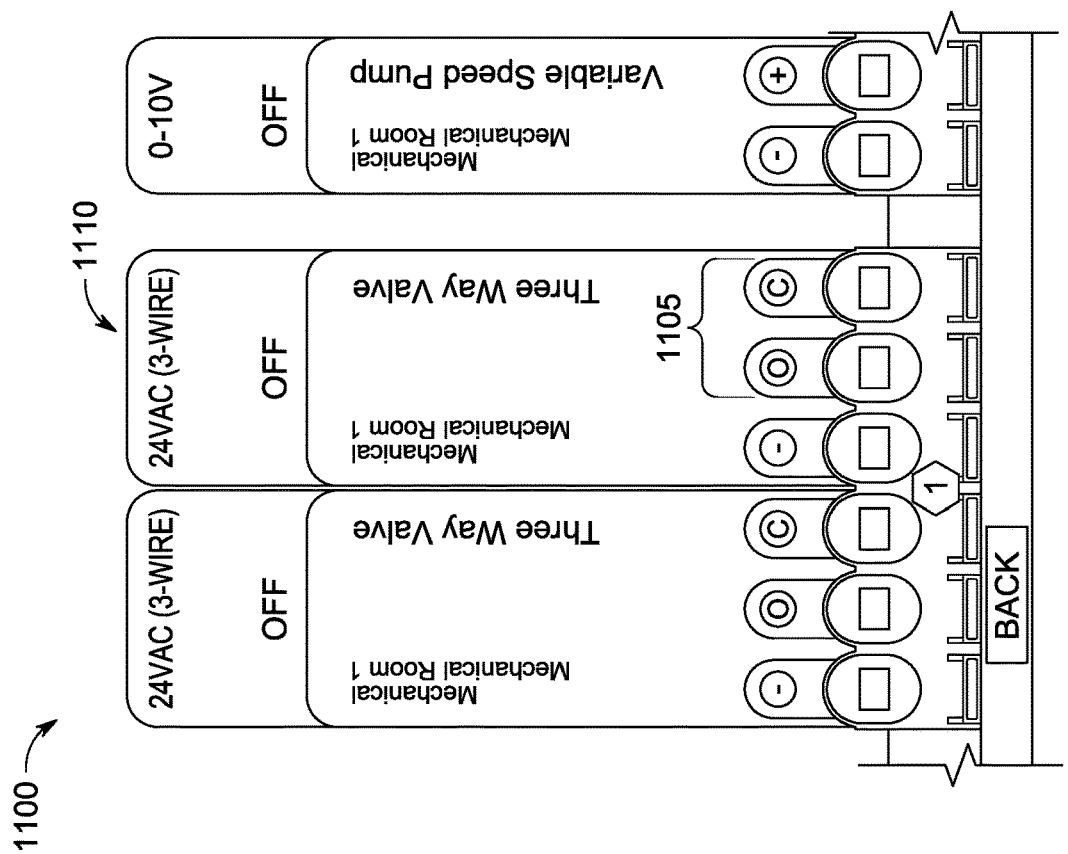
Figure 11:
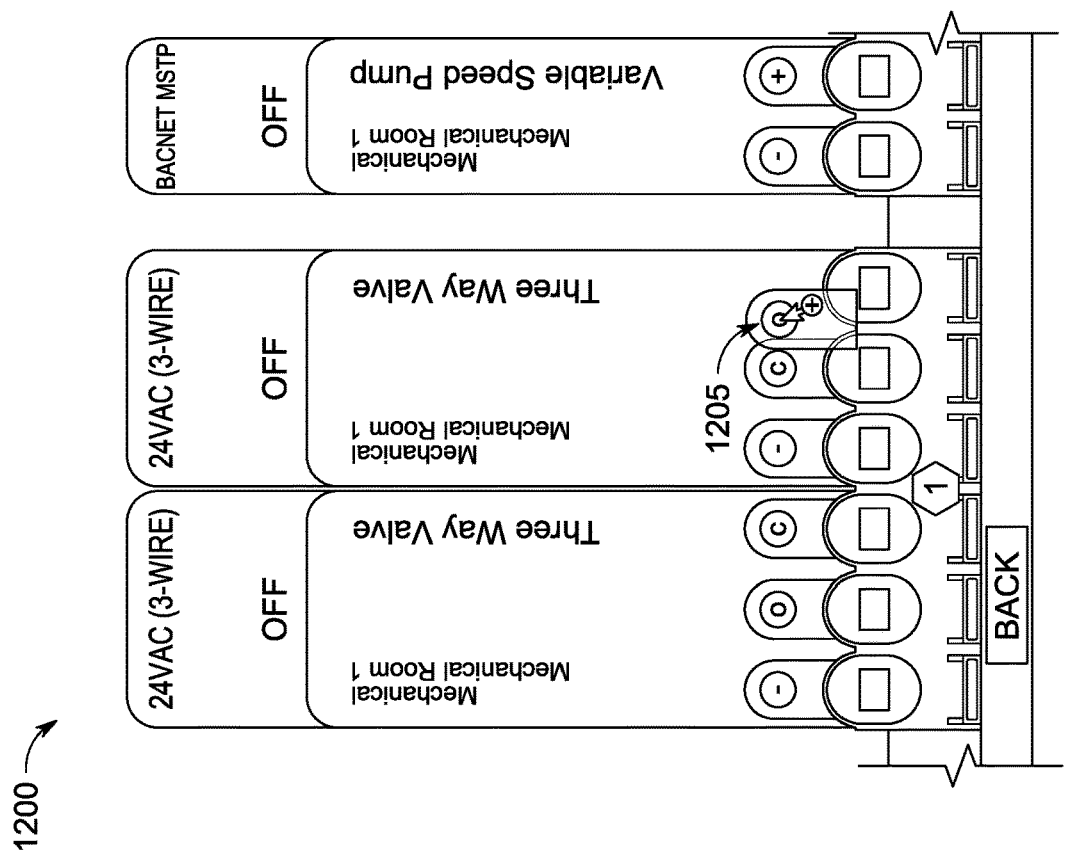

FIGS. 11 and 12 show two partial screenshots at 1100, and 1200, where, in the illustrative embodiment, the moveable interactive screen is able to allow a user to define a parameter of the representation of the device connection 105B. This will modify subsequent operation of the controller terminal attachment 140 or module attachment 110A as the controller will pass messages to the controller terminal attachment 140 or module attachment 110A that will be appropriate for the newly-defined parameter. The display 1200 indicates that there is a three-way valve 1110 with a 24 VAC (3-wire) protocol that is (or may be) attached to the controller 100. The connector terminal attachments have been assigned wiring of (−), (O), and (C), from left to right. Specifically, the (O) is in the middle, and the (C) is at the right, as shown at 1105. With reference to FIG. 12 at 1200, a user can change the wiring on the pins by selecting a terminal representation 1205, at which point the user will be able to change what the wire is expected to be. In this example, the (C) and (O) wire representations are swapped. In some implementations, swapping the representations on the display also swaps the actual nature of the pins that the resource will be wired to, as the hardware associated with the pins can be changed using software stored and able to be used within the controller that controls hardware associated with the pins.

FIGS. 13 and 14 show two partial screenshots at 1300 and 1400 where a resource can be moved from one set of terminal attachments on the controller to another set. This also displays swapping device wires. This will modify subsequent operation of the device connection 105B as the controller will pass messages to the device connection 105B that will be appropriate for the newly-defined parameter. A three-way valve with dry contacts 1305 resides in the fifth and sixth positions (from the left) on the displayed portion of the controller. The device connections 105B are of type (B) (A), reading from left to right. A user can select the three-way valve 1305 and move it one controller terminal representation to the left, as shown at 1405. The user can also swap the wires that will be wired to the terminal attachments, such that the left wire of the device which was an (A) 1305 will be (B) 1405, and the right wire of the device swaps from (A) to (B), as shown at 1405. The representations of the controllers now switch on the controller section that we see from (−), (O), (C), (blank) (B) (A) from left to right, to (−), (O), (C), (B) (A), (blank) This will, in some times and in some embodiments, change the nature of the actual controller terminals to those shown on the screen. In some embodiments with modules, the module that the devices are being hooked to is marked with a symbol 1310. In some embodiments, this symbol is a number, such as the "1" seen here.

Figure 15:
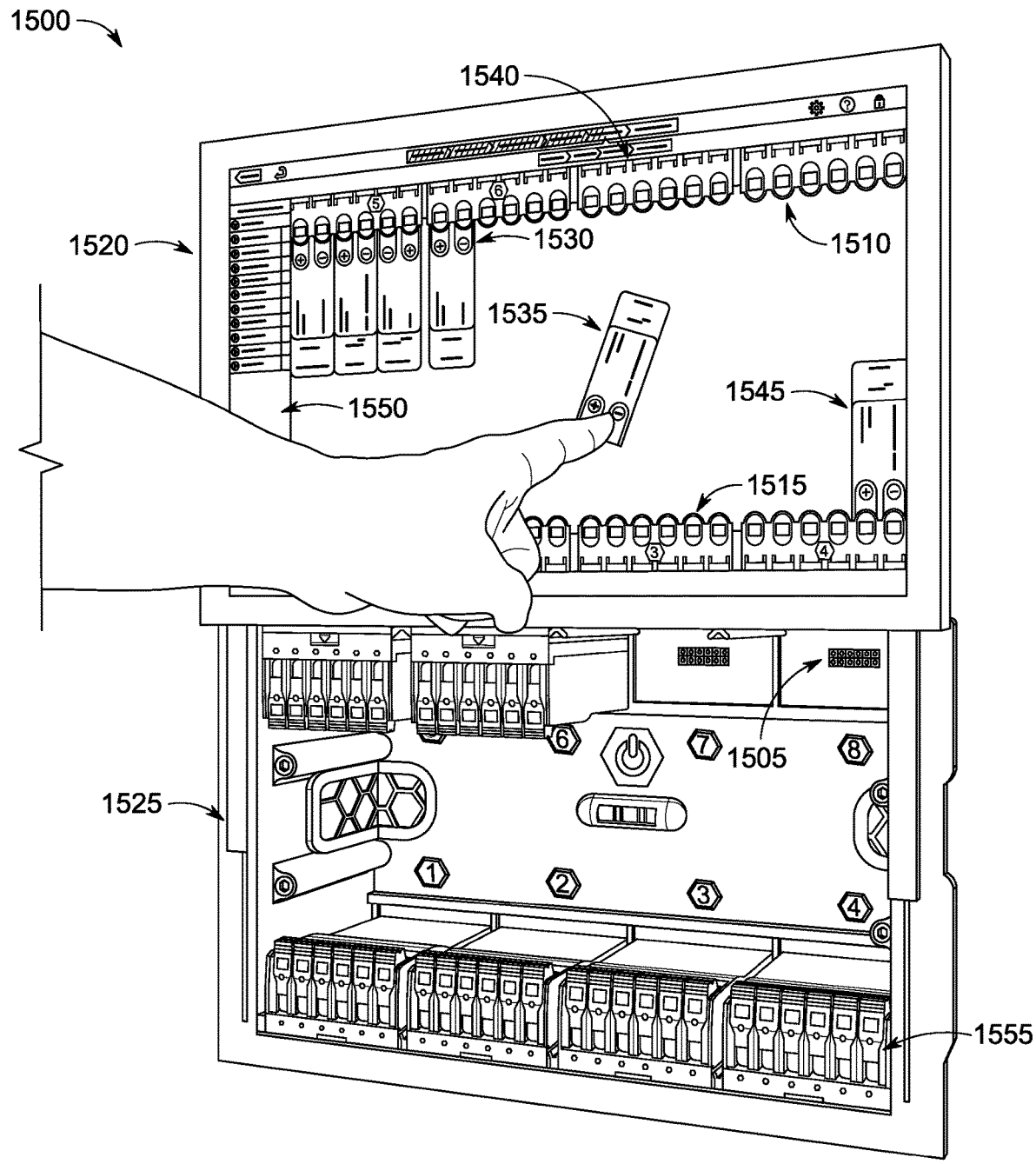
FIG. 15 shows an exemplary moveable interactive screen with the controller in an open position.

FIG. 15 shows an example of the controller 1500 in an open position such that the inside of the controller box 1525 can be seen simultaneously with the movable interactive screen 1520. The controller box 1525 holds the modules 1555 while the moveable interactive screen shows what devices are (or will be) attached to the modules 1555. For example, a device representation 1545 represents a device that is expected to be attached to the last two terminal connectors (from left to right) of module 1555. On the interactive display 1520, a screen 1540 is shown that displays, among other things, labeled parameters, e.g., labels that show values of the connections 1545, e.g., (+) and (−), labels describing what specific device is to be (or is) connected to the last two (from left to right) module/device attachments 115A of module 1555. The screen also shows what wire values that are to be expected (including protocols) on the wire or wires 1530, in this case (−) and (+). Examples of the individual labels and values can be seen with reference to FIGS. 11-14. Other values and labels may be displayed as well.

In this embodiment, the interactive display holds eight modules, each which have six device connections, with which a device wire can be directly wired into the module. The module then passes information through the device connection 1505 to the controller hardware 110 and memory 115. A representation 1510 of a device connection 105B can also be seen. There is no module in module location 8 so the connections 1505 can be seen in the open controller, and so are represented on the interactive screen 1540 as a location 1510 with no module (no badge with a number, as described elsewhere).

Figure 16:
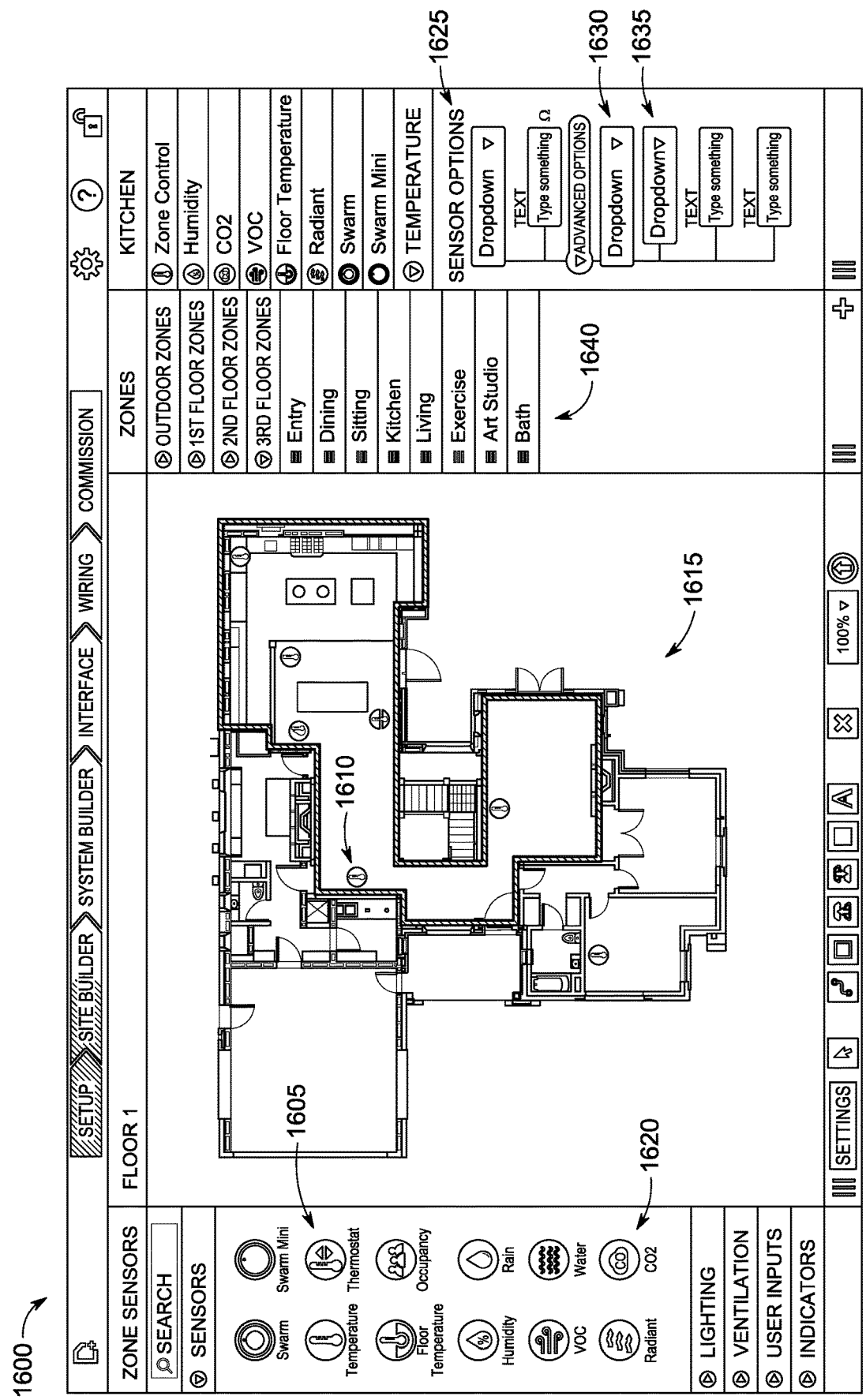
FIG. 16 is an exemplary screenshot embodiment that allows a user to position a resource in a location within a structure.

FIG. 16 shows a screenshot embodiment 1600 that allows a user to position a device in a location within a structure. In this embodiment, a user chooses a device 1605 from a panel 1620 with possible devices listed in it, and then drags the device to a location 1610 within a representation of the space 1615 that the controller may be operating in. This allows the moveable interactive screen to accept the device location within a space by associating it with its displayed location on the displayed space 1615. The controller can then accept the device and any resource location data associated with it, and store it in memory 115. This device location data also comprises a designated space—the space the modeled resource is occupying, which is expected to correlate with an actual location that a real resource will occupy.

In some embodiments, the user can associate a device, such as the thermostat 1605 with one or more terminals on the controller (or a module associated with the controller) using the interface shown with reference to FIGS. 5-7 and 11-15. Once a resource is chosen, placed within a representation of a structure (e.g., 1615), and located on a controller, then the computer hardware and the programmable memory are able to at least partially design a wiring diagram between the resource and the controller terminal, as they know the location of the resource, the wiring requirements of the resource, the location of the controller, and other information necessary to create the wiring diagram. In some embodiments, a user determines controller location; in some embodiments, the controller determines its own location. In some embodiments, there are multiple controllers. In some embodiments, multiple controllers work together as a distributed system. In systems with multiple controllers, one controller may be elected a master controller that determines the work load of the other controllers.

With further reference to FIG. 15, in some embodiments, labels can be moved by a user touching the label representation 1535 and moving it to a new terminal attachment location, such as 1515. In some embodiments, the type of resource can be chosen by a user on a section of the screen, and then moved into position. An example of this is shown with reference to FIG. 17.

At 135 an updater is disclosed. This updater is operationally able to update the representation of the device connection 105B on the moveable interactive screen when the device connection 105B is modified. Embodiments of this can be seen with reference to FIGS. 5, 6 and 7. With reference to FIG. 5 at 500, a resource (a variable speed pump) with a 0-10 v wiring interface is shown as being attached (or expecting to be attached) to the controller. As shown at FIG. 6 at 605, a user can choose the label, which produces a new menu associated with the label. This menu shows protocols that can be associated with the currently-chosen variable speed pump. These are 0-10V, 2-10V, 0-20 mA, and Bacnet MSTP. When a user selects BacNet MSTP, the screen appears as shown in FIG. 7 at 705. We can see that now the BACNET MSTP interface has been applied. If changes are necessary on the specific pins 710, they can be made as well, as hardware associated with the pins that can be modified in software associated with the controller. This updater may be a computer program (software) 130 stored in memory 115.

In some embodiments, when the moveable interactive screen is open, displaying the wiring, the controller can be configured to modify the representations of the devices attached to the controller on the display. An example of this is shown in FIG. 15, where a user 1550 is modifying the display by moving a representation of a device from one set of the device connection 105B representations to another set. Another modification comprises changing the functionality of the device connection 105B to match requirements of the device. In such circumstances, hardware and software in the controller, the module, or a combination of the controller and the module modifies the device connection. Other modifications that the user can make to a representation of a device comprise changing the device name, the device location on the controller, or a device operating characteristic. These modifications are then expected to be matched by the device that is (or will be) attached to the controller at the given location.

With further reference to FIG. 16, the user may choose a device representation 1605 from a panel 1620, and then drag or otherwise move the device representation 1605 to a location 1610 within a representation of a space 1615 that the controller will be operating in. This allows the moveable interactive screen to accept the device location, by associating it with its location on the displayed space. This resource location data also comprises a designated space—the space the modeled device is occupying, which is expected to correlate with an actual location that a real device will occupy. The panel 1620 may hold different types of objects, or, as in the instant example, may hold a specific type of object, in this case sensors. The type of object can be further defined on a panel 1625, which may allow a user to specify a specific type of object. A specific type of object may have other features that can be defined by using other dropdown menus 1630, 1635. The portion of the designated space that is having devices placed can be changed using a location panel 1640. In the illustrated embodiment, the kitchen is displayed. Choosing other selections, such as "bath," will display the floor plan for the area designated as "bath," and so on. These changes on the moveable interactive display 125 allow the controller to instruct the device connection 105B to change the nature of the device connection 105B (e.g., from an (A) to a (B), etc.). This instruction may be of the form of software 120 in memory 115 instructing the controller terminal attachment to change characteristics, the computer hardware physically changing characteristics of the device connection 105B, software 120 in memory 115 instructing the module attachment 110A to change characteristics, the computer hardware physically changing characteristics of the controller terminal attachment, etc.

Figure 17:
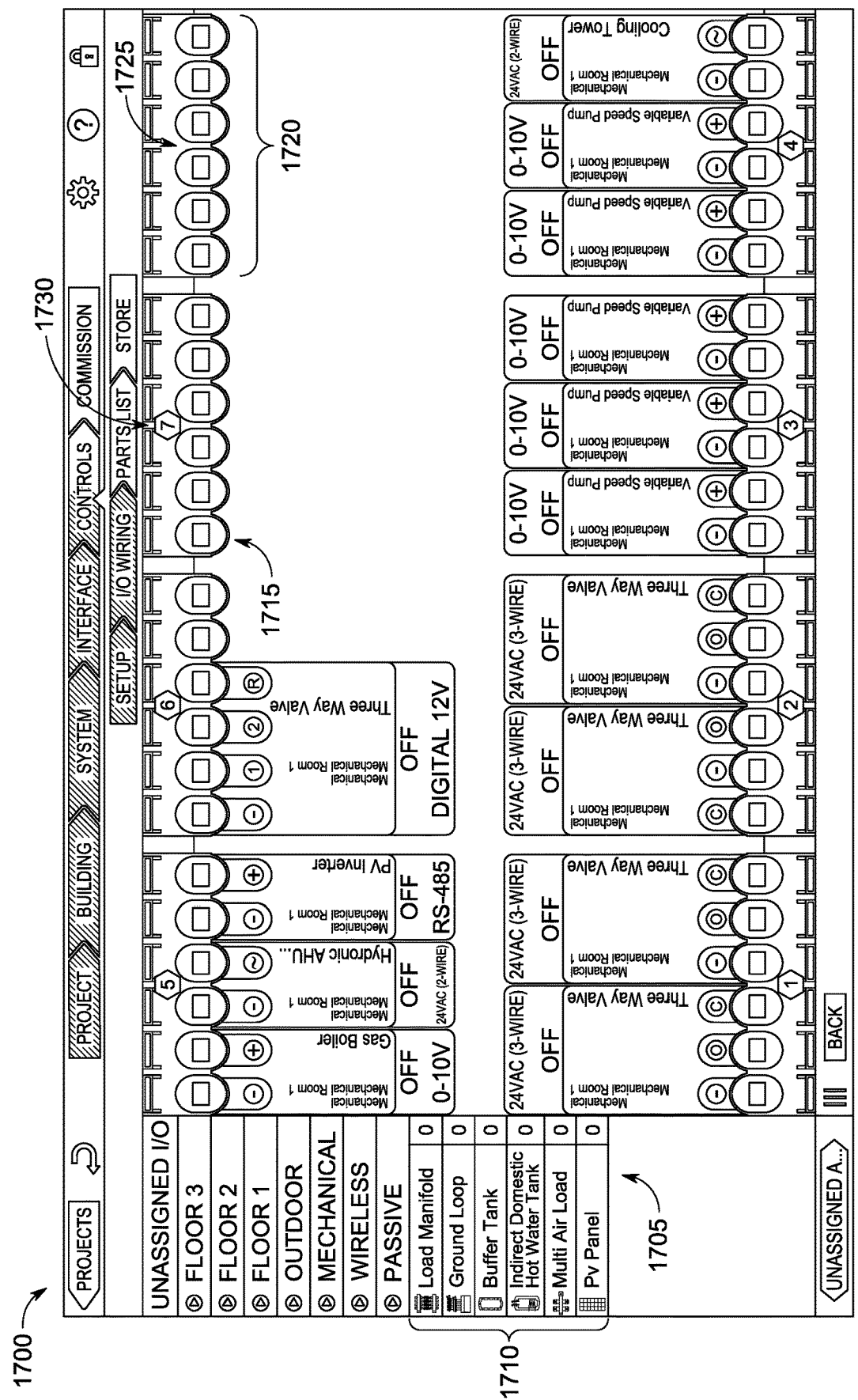
FIG. 17 is an exemplary screenshot embodiment that allows a user to locate devices within a controller.

FIG. 17 depicts a screen 1700 with which a user can associate a device with one or more terminals on the controller (or a module associated with the controller). For an illustrative example, a user can select a resource 1705 from a list of predefined resources 1710 (in this exemplary embodiment, Load Manifold, Ground Loop, Buffer Tank, Indirect Domestic Hot Water Tank, Multi Air Load, and PV Panel, which might have been placed within a building representation such as shown with reference to FIG. 16), and then move the chosen resource into an empty controller connection position, e.g., 1715. Once this is done, the computer hardware and the programmable memory are able to at least partially design a wiring diagram between the resource and the controller terminal, as they know the location of the resource, the wiring requirements of the resource, the location of the controller, and other information necessary to create the wiring diagram. In this illustrative embodiment, there are seven models in the controller, indicated by a hexagonal numbered badge 1730. There is no module at 1720, indicated here by lack of a visual mark 1725. These are implementation details and can be designated different ways in different embodiments.

In some embodiments, and as discussed earlier, the controller accepts removable modules. A removable module in a controller can be seen with reference to FIG. 8 at 805. The connection between the controller and the module is seen at 810. In this representation, the connection comprises sixteen pogo connectors which will connect to eight potential wires that will be attached to the module, providing at least one direct connection between a device wire and the controller. FIG. 9 at 900 shows a removable module outside of the controller. The module attachment 110A can be seen at 910; it attaches to the controller attachment at 810. Wires from devices that are to be attached to the controller are placed into module contacts shown at, e.g., 905. The information from the wires (and to the wires from the controller) passes from the wire to a module contact 910, then to the controller contact 810, and then to the hardware and software stored in memory in the controller.

In some embodiments, when the moveable interactive screen is open, displaying the wiring, the controller can be configured to modify the representations of the devices attached to the controller on the display. An example of this is shown in FIG. 15, where a user 1550 is modifying the display by moving a representation of a device from one set of controller terminal attachment representations to another set. Another modification comprises changing the functionality of the device connection to match requirements of the device. In such circumstances, hardware and software in the controller, the module, or a combination of the controller and the module modifies the device connection. Other modifications that the user can make to a representation of a device comprise changing the device name, the device location on the controller, or a device operating characteristic. These modifications are then expected to be matched by the device that is (or will be) attached to the controller at the given location.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A controller comprising:
a housing;
computer hardware and a programmable memory attached to the housing;
a moveable interactive screen, attached to the housing, controlled by the computer hardware and programmable memory;
an inside surface of the housing with a controller terminal attachment;
the moveable interactive screen operationally able to display a representation of the controller terminal attachment;
the moveable interactive screen able to move in a first way such that:
the inside surface of the housing is exposed, showing the controller terminal attachment,
a representation of the controller terminal attachment in a current state is displayed on the moveable interactive screen;
the moveable interactive screen operationally able to move in a second way to hide the inside surface of the housing, hiding the controller terminal attachment;
wherein the controller terminal attachment is operationally able to attach to a removable module; and
wherein the moveable interactive screen is operationally able to close to hide the removable module when the removable module is attached to the controller terminal attachment.

2. The controller of claim 1, further comprising an updater which is operationally able to update the representation of the controller terminal attachment on the moveable interactive screen when the controller terminal attachment is modified.

3. The controller of claim 1, further comprising operational ability to allow a parameter definition of the representation of the controller terminal attachment to be modified upon receipt of an instruction by the moveable interactive screen that the parameter definition has been received.

4. The controller of claim 1, further comprising operational ability to display, on the moveable interactive screen, a representation of the controller terminal attachment, a representation of the removable module, and a representation of a device operationally attached to the removable module.

5. The controller of claim 4, wherein the representation of the device is moveable to a representation of a second controller terminal attachment.

6. The controller of claim 5, further comprising operational ability to modify a protocol of the device.

7. The controller of claim 6, further comprising operational ability to modify a controller terminal attachment.

8. A controller comprising:
a housing;
computer hardware and a programmable memory attached to the housing;
a moveable interactive screen attached to the housing, the moveable interactive screen operationally able to display images;
a controller terminal attachment on an inside surface of the housing;
the moveable interactive screen in a first position operationally able to show a representation of the controller terminal attachment in a current state;
the controller operationally able to hide the inside surface, including the controller terminal attachment, when the moveable interactive screen is in a second position;
wherein the controller terminal attachment is operationally able to attach to a removable module; and
wherein the moveable interactive screen is operationally able to close to hide the removable module when the removable module is attached to the controller terminal attachment.

9. The controller of claim 8, further comprising the computer hardware and programmable memory operationally able to allow a user to define a representation of a device using the moveable interactive screen, the device operationally able to connect to the controller terminal attachment.

10. The controller of claim 8, further comprising the controller operationally able to display, on the moveable interactive screen, a representation of the controller terminal attachment, a representation of the removable module, and a representation of a device operationally attached to the removable module.

11. The controller of claim 8, further comprising a module attachment, and wherein the module attachment comprises a bar to load a spring in the removable module.

12. The controller of claim 8, further comprising a module attachment, and wherein the module attachment comprises a hook tab.

13. The controller of claim 9, further comprising the controller operationally able to modify the controller terminal attachment.

14. The controller of claim 13, further comprising the moveable interactive screen operationally able to display the representation of the device when the moveable interactive screen is in the second position.

15. The controller of claim 8, further comprising the computer hardware and programmable memory operationally able to allow a user to define a representation of a device using the moveable interactive screen, the device operationally able to connect to the controller terminal attachment.

16. The controller of claim 15, further comprising the computer hardware and programmable memory operationally able to modify the controller terminal attachment.

17. The controller of claim 16, further comprising modifying the controller terminal attachment upon receipt of a message sent from the moveable interactive screen.

18. A controller in a box with an inside, the controller with a processor and memory, comprising:
- a device connection mounted on the inside of the box, the device connection operationally able to couple to at least one device;
- a screen moveably attached to the controller, the screen operationally able to move such that the inside of the box, and the device connection is shown;
- the screen operationally able to move such that the inside of the box, and the device connection is hidden;
- the screen configured to display a current state of at least one representation of the device connection;
- wherein the device connection is operationally able to attach to a removable module; and
- wherein the screen is operationally able to close to hide the removable module when the removable module is attached to the device connection.

19. The controller of claim 18, further comprising being operationally able to change-operation of the at least one device connection upon receipt of an instruction.

20. The controller of claim 19, further comprising changing a functionality of the device connection to match requirements of a new device upon receipt of an instruction by the screen that the new device has been chosen.

* * * * *